O. F. BALTZLEY.
BOTTLE CAP MACHINE.
APPLICATION FILED SEPT. 28, 1920.
1,415,507.  Patented May 9, 1922.
26 SHEETS—SHEET 3.
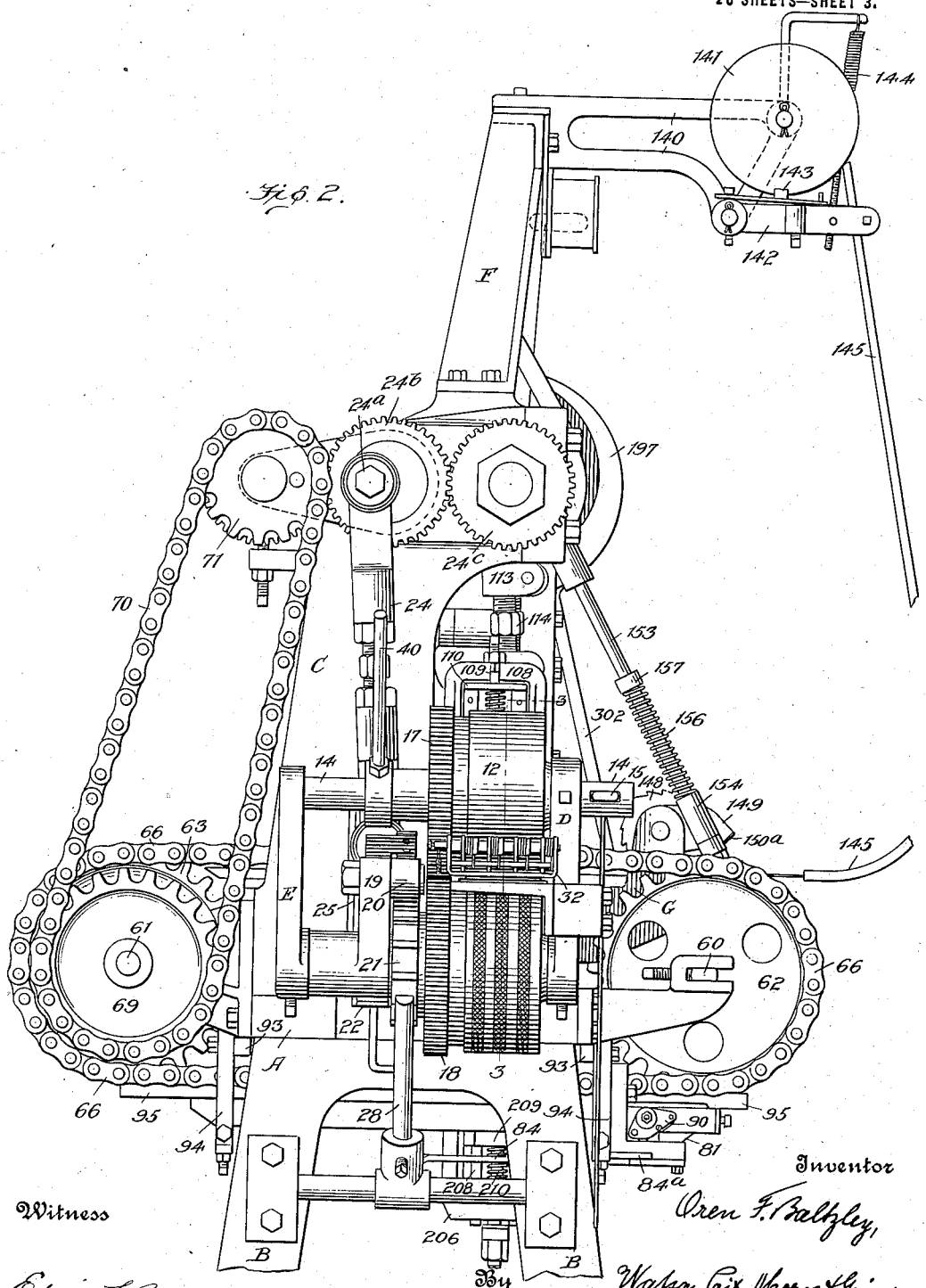

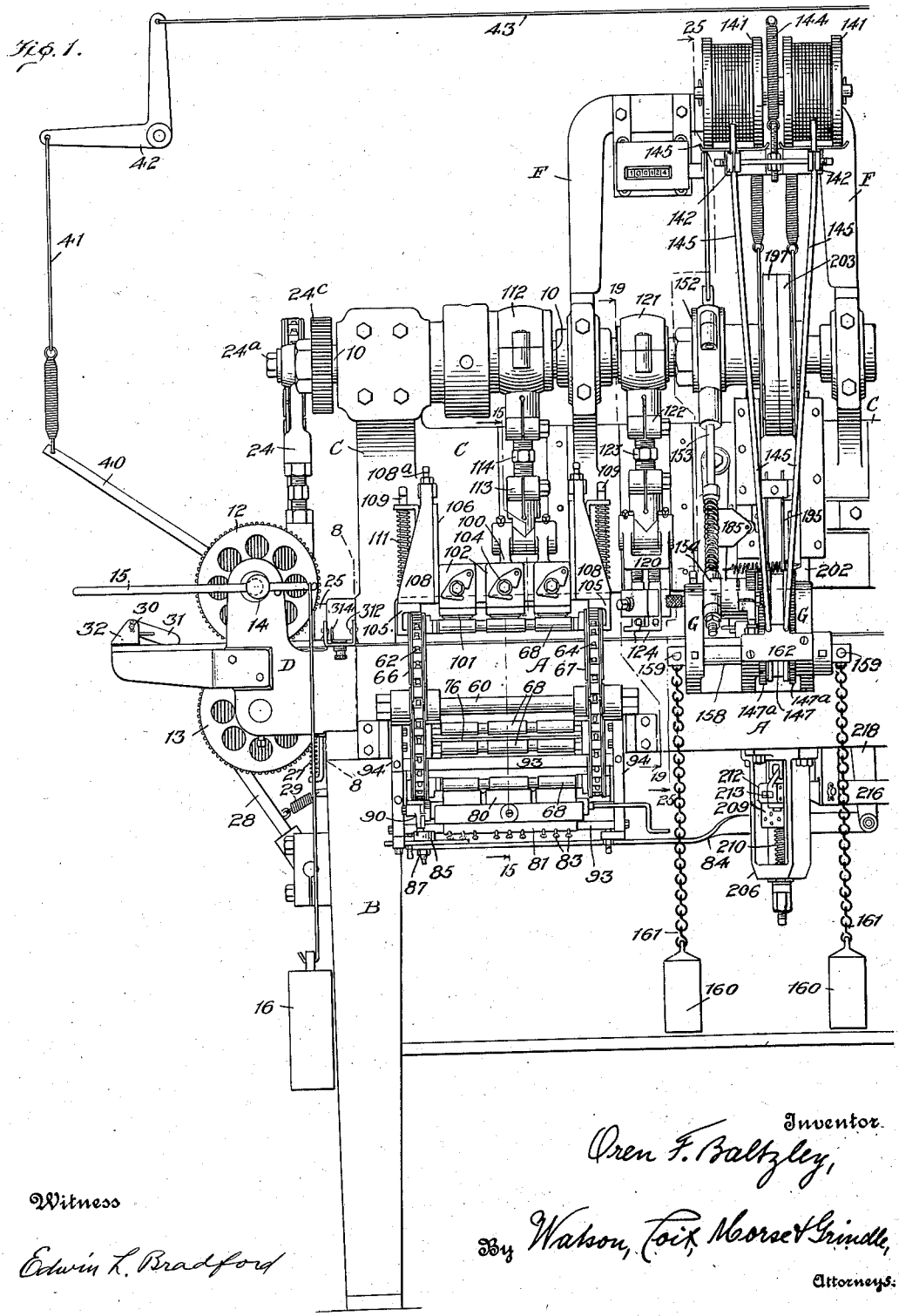

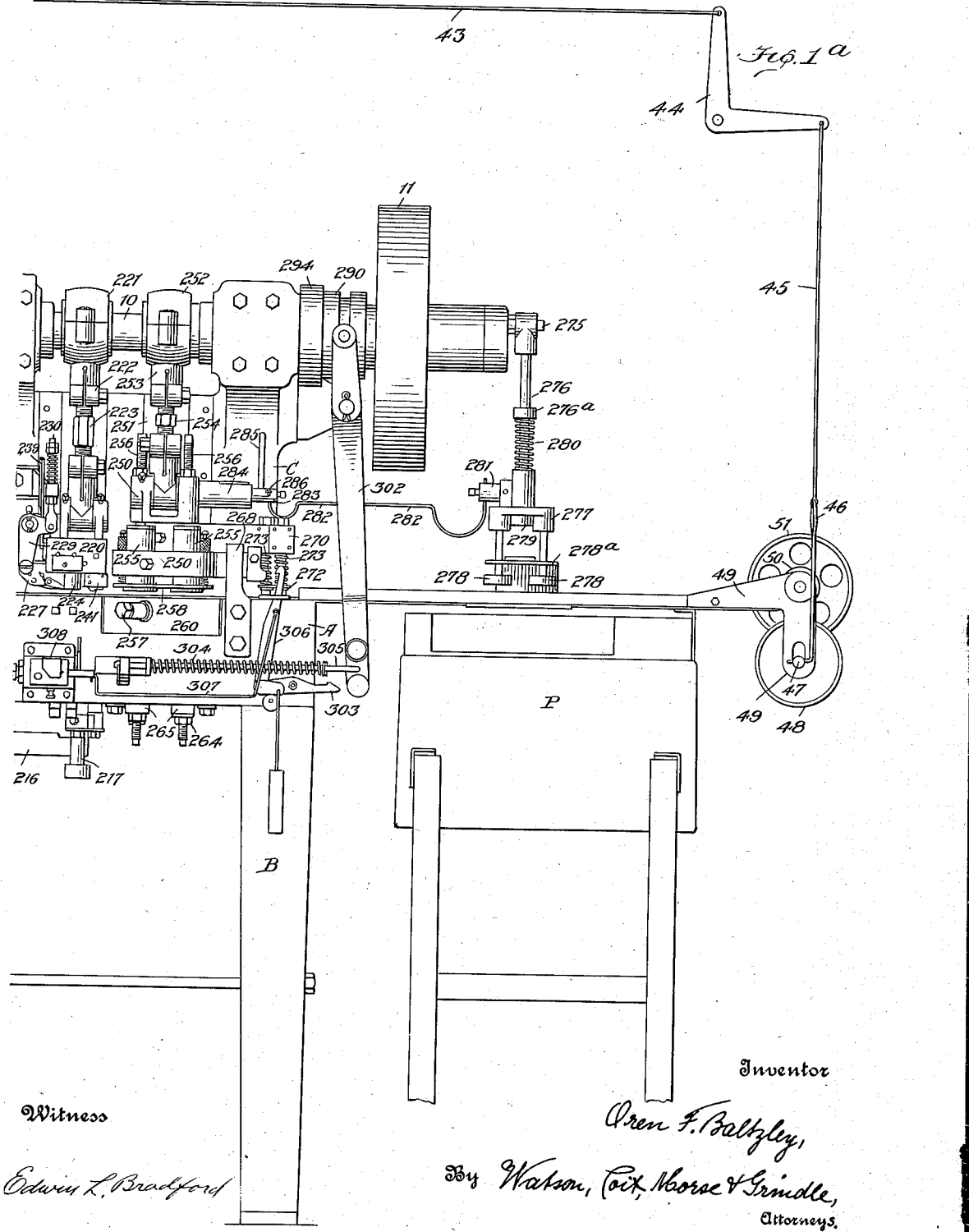

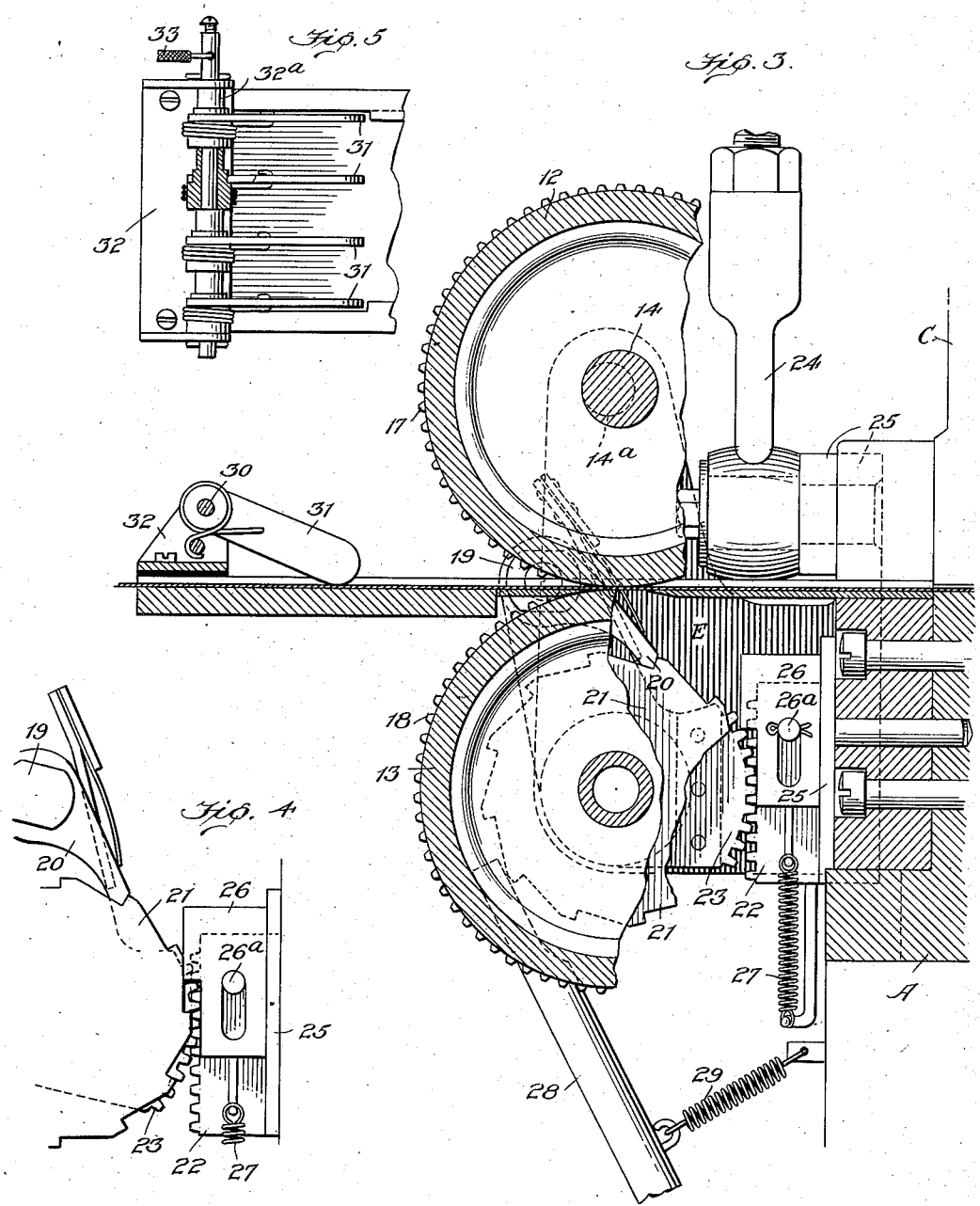

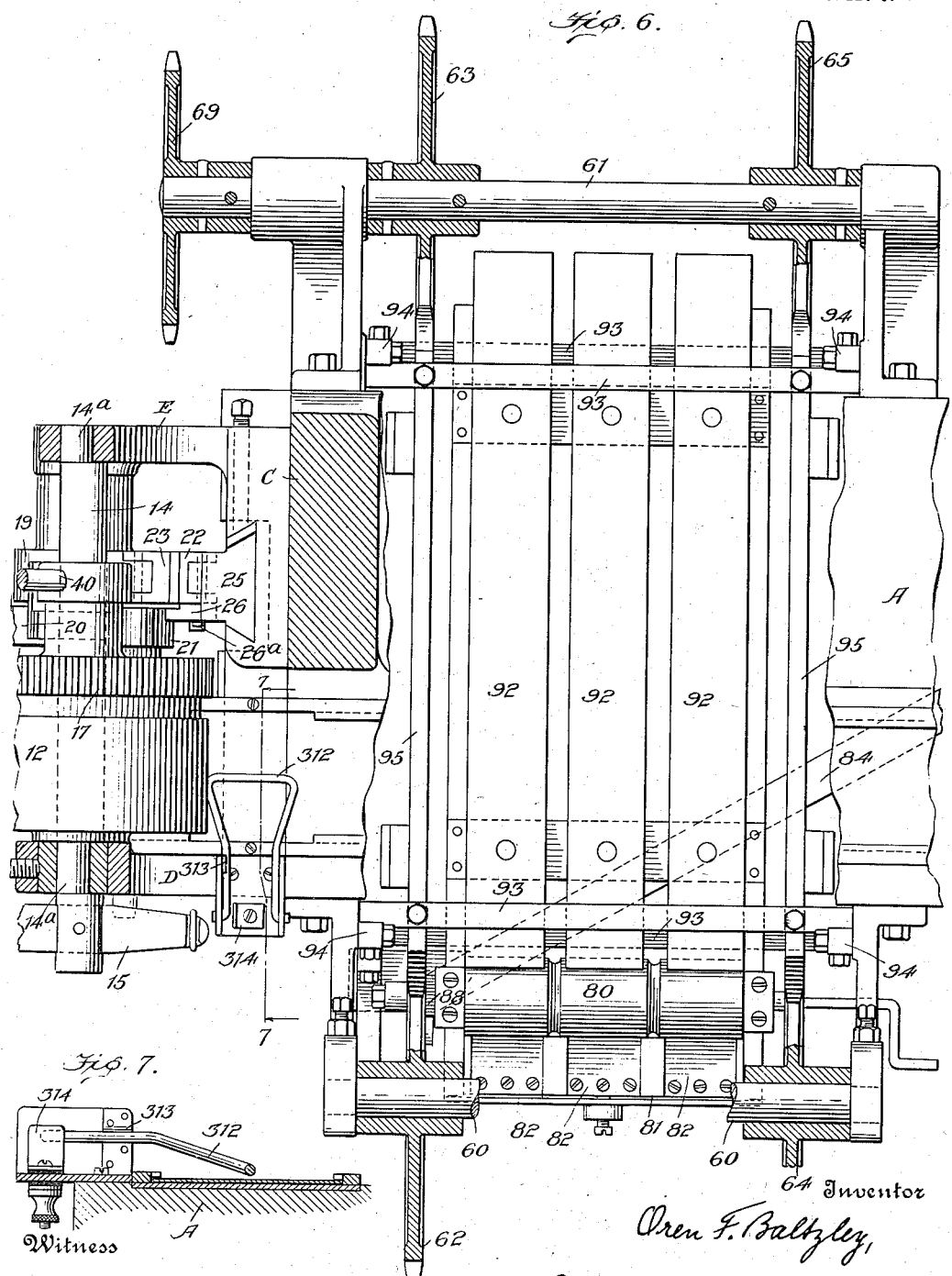

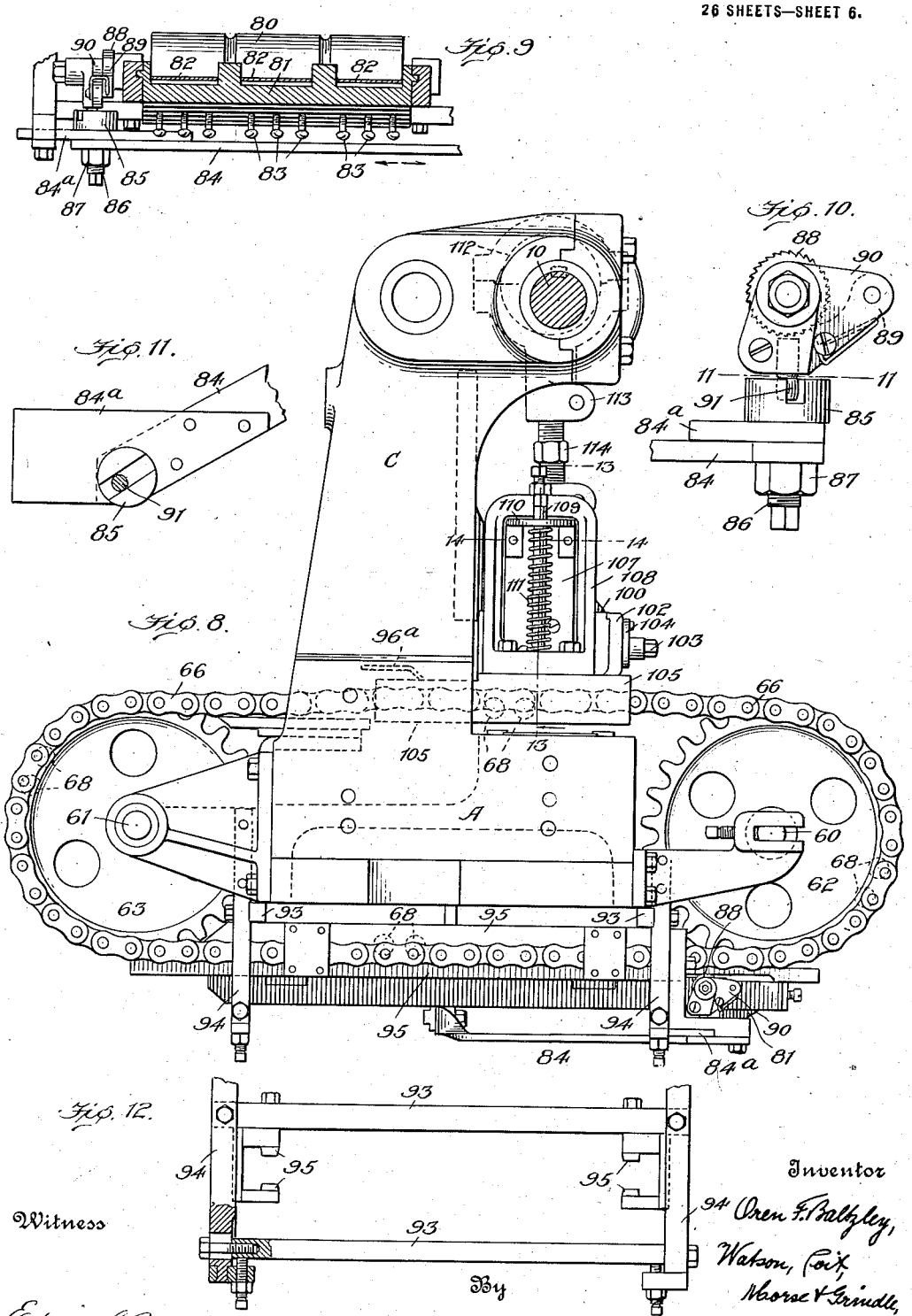

O. F. BALTZLEY.
BOTTLE CAP MACHINE.
APPLICATION FILED SEPT. 28, 1920.

1,415,507.

Patented May 9, 1922.
26 SHEETS—SHEET 7.

Witness
Edwin L. Bradford

Inventor
Oren F. Baltzley,
By Watson, Coit, Morse & Grindle,
Attorneys.

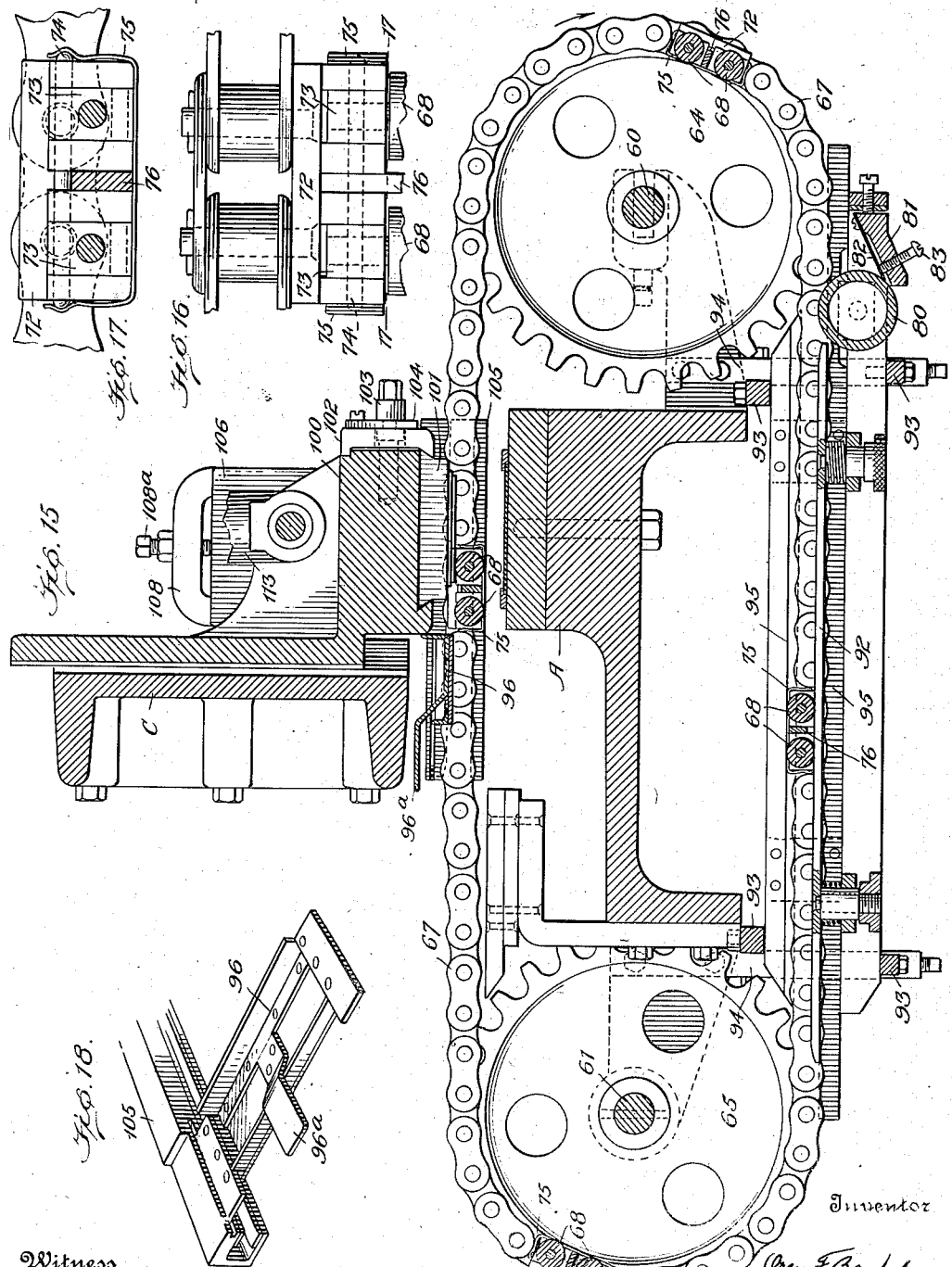

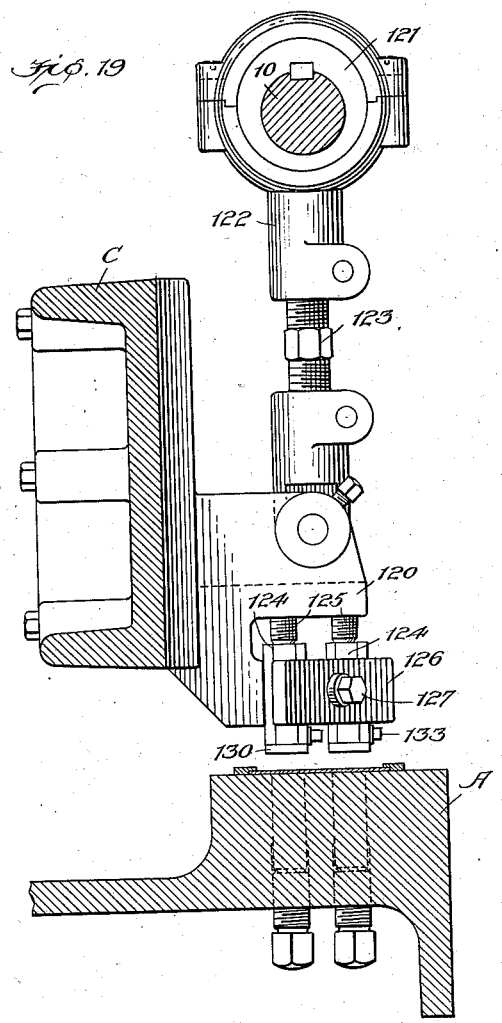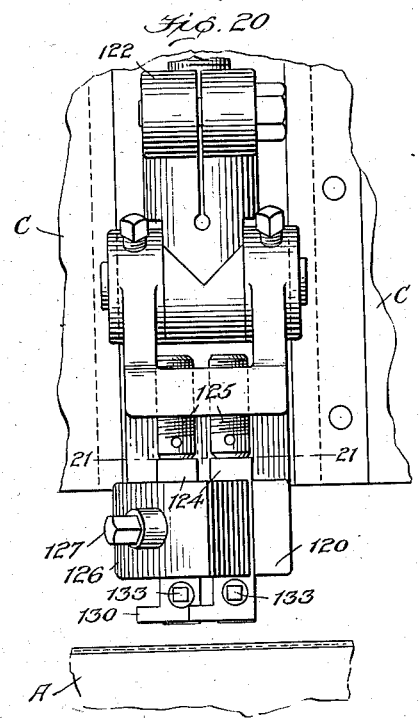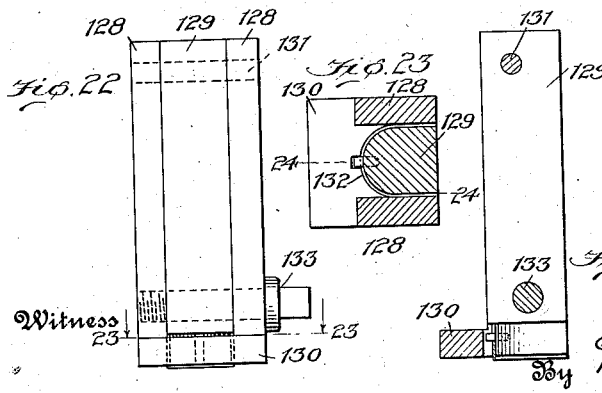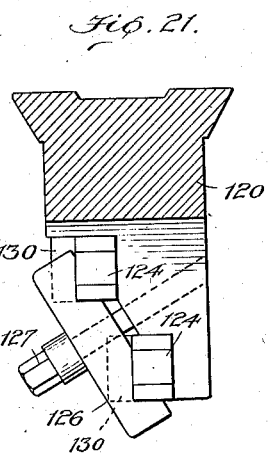

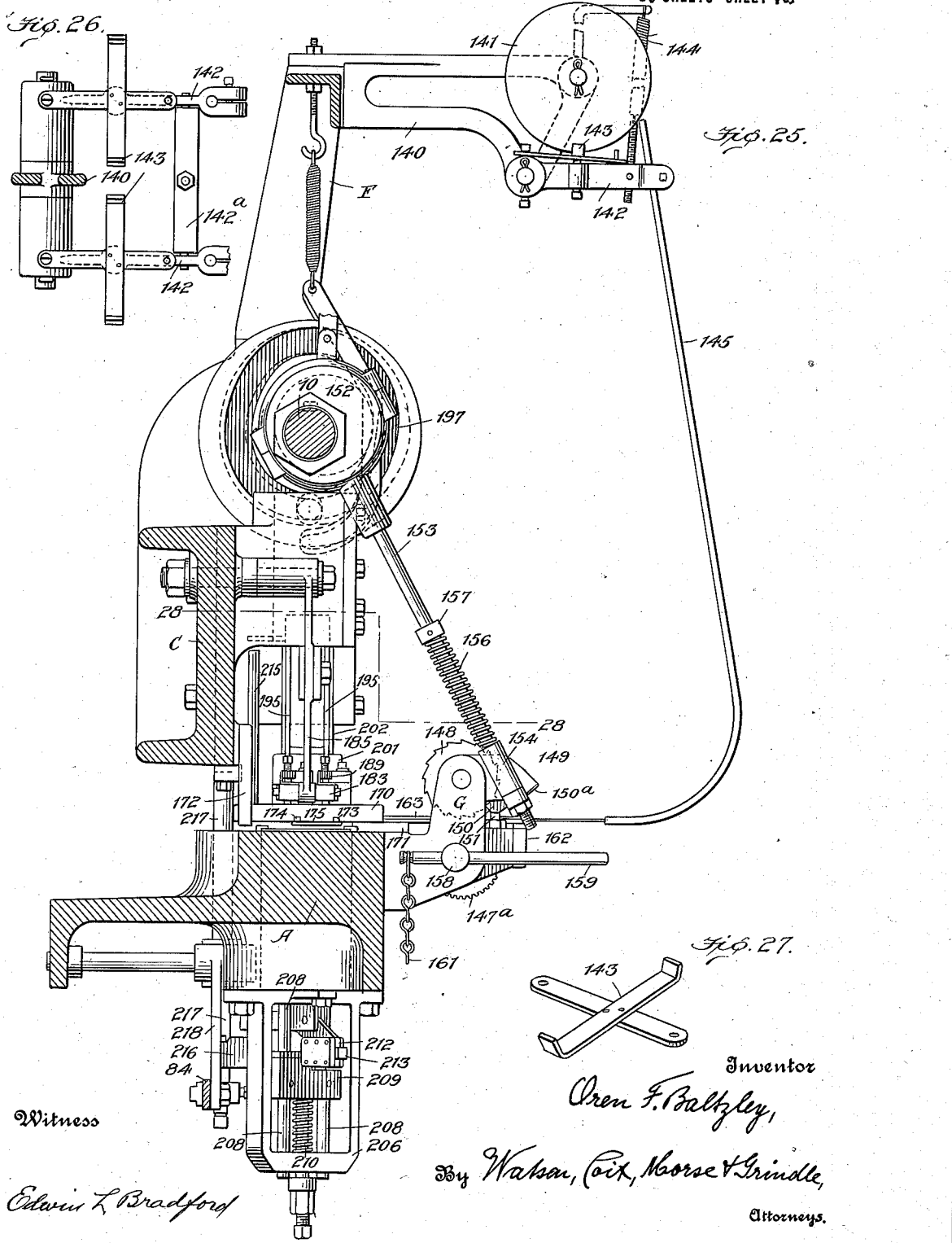

O. F. BALTZLEY.
BOTTLE CAP MACHINE.
APPLICATION FILED SEPT. 28, 1920.
1,415,507.
Patented May 9, 1922.
26 SHEETS—SHEET 11.
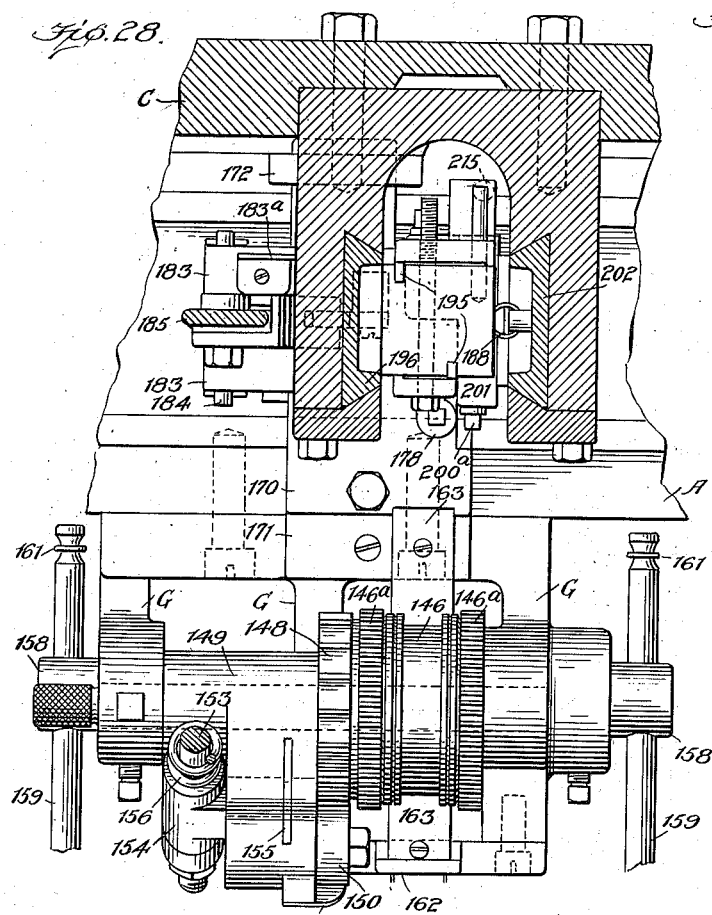
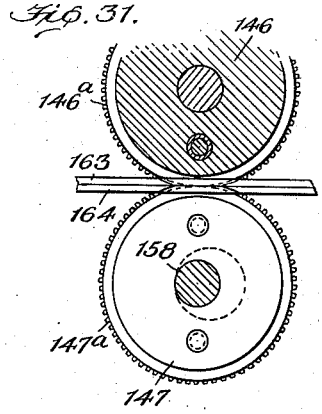
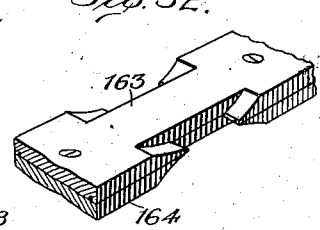
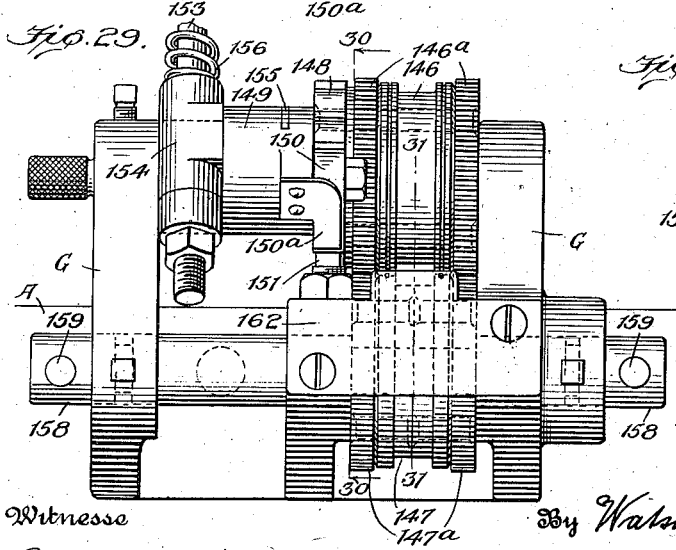
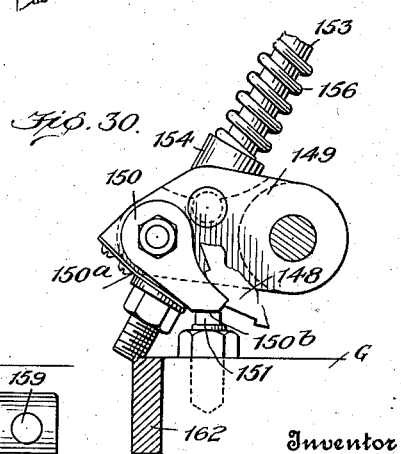
Inventor
Oren F. Baltzley,
By Watson, Coit, Morse & Grindle,
Attorneys.
Witnesses
Edwin L. Bradford O. F. BALTZLEY.
BOTTLE CAP MACHINE.
APPLICATION FILED SEPT. 28, 1920.
1,415,507.
Patented May 9, 1922.
26 SHEETS—SHEET 12.
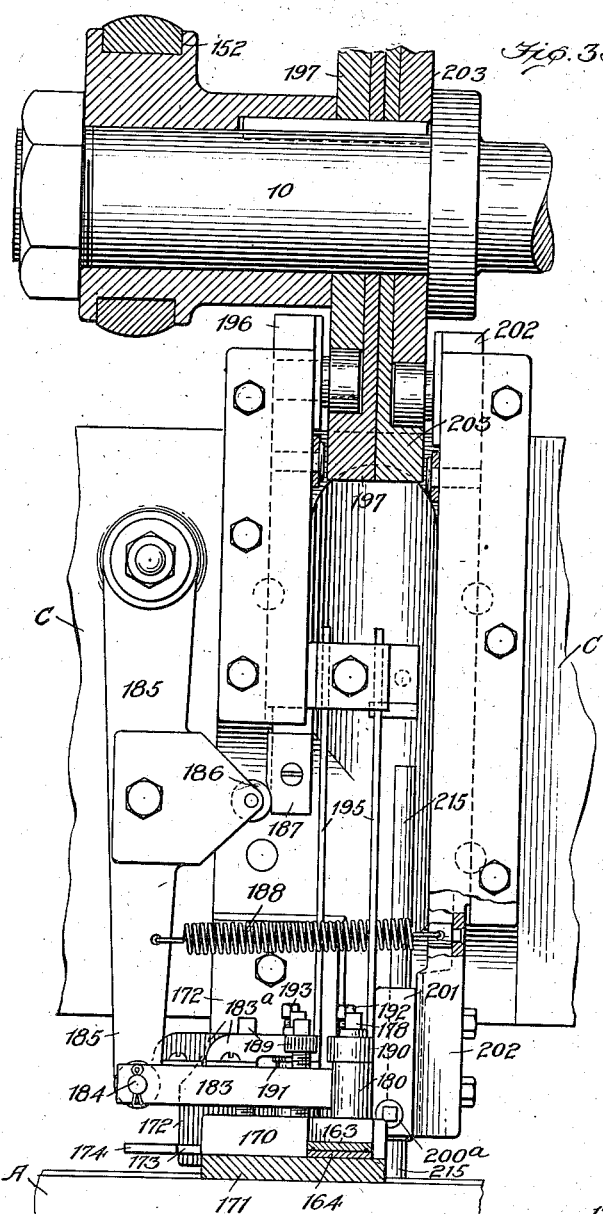
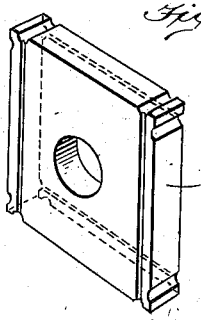
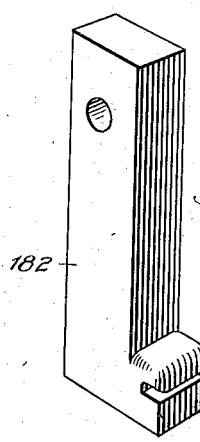
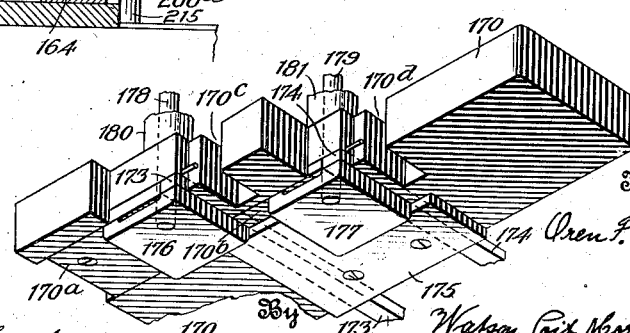

O. F. BALTZLEY.
BOTTLE CAP MACHINE.
APPLICATION FILED SEPT. 28, 1920.

1,415,507.

Patented May 9, 1922.
26 SHEETS—SHEET 13.

Witness
Edwin L. Bradford

Inventor
Oren F. Baltzley,
By Watson, Coit, Morse & Grindle,
Attorneys.

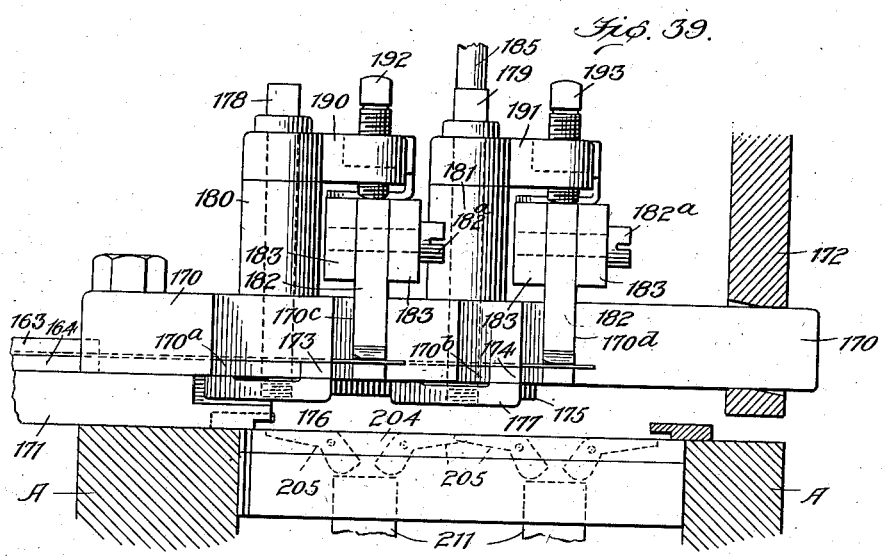
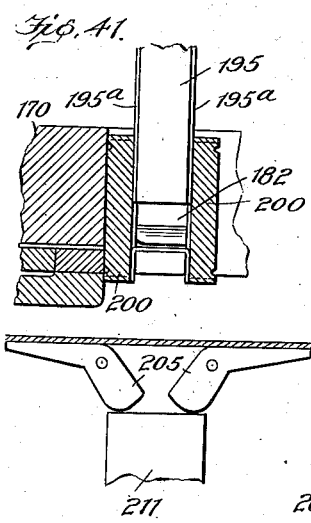
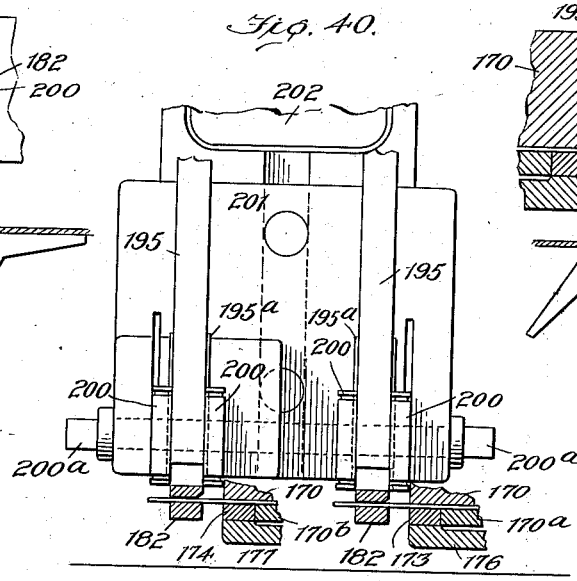
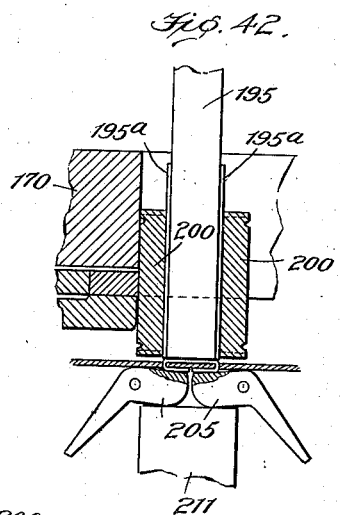

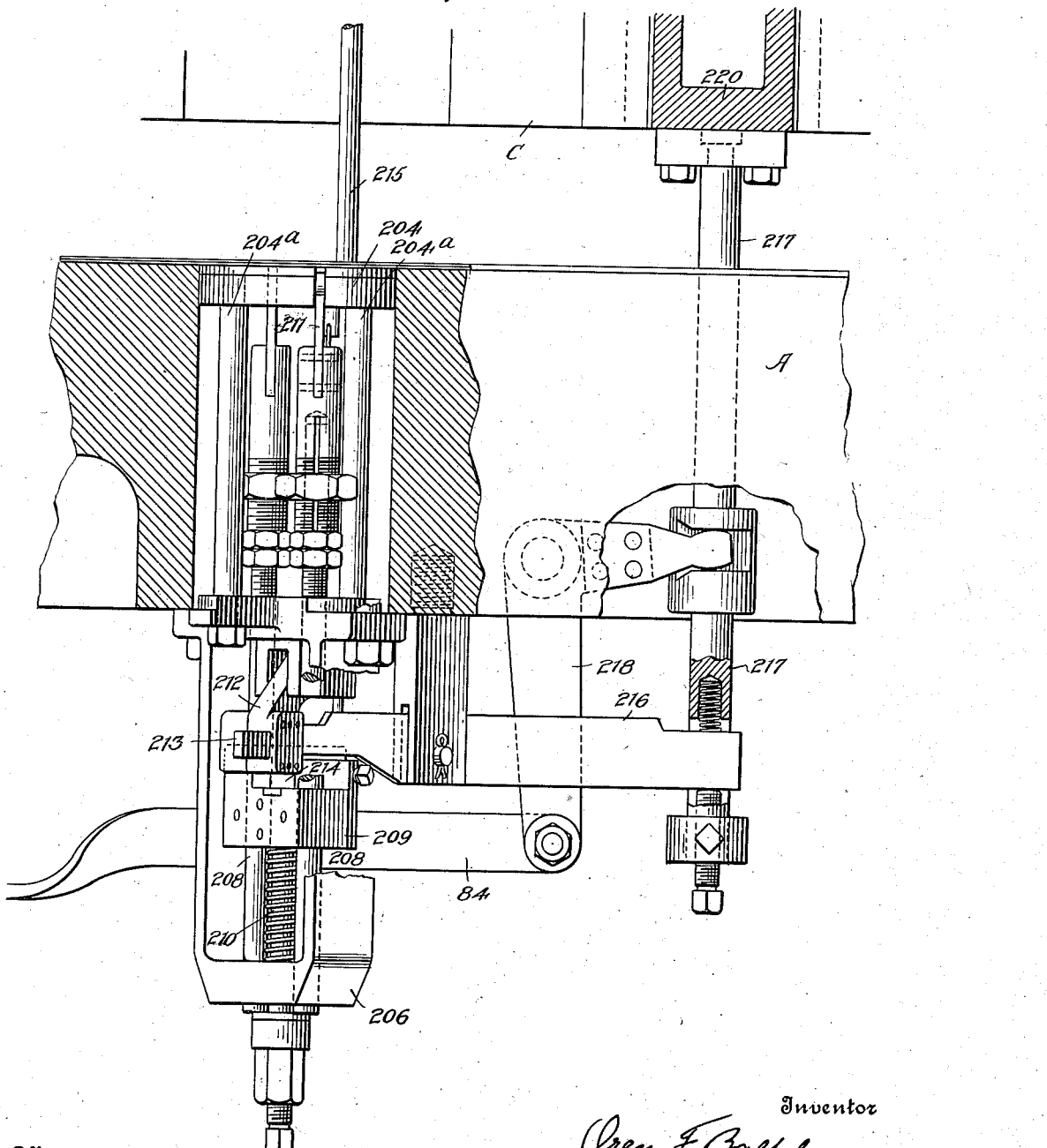

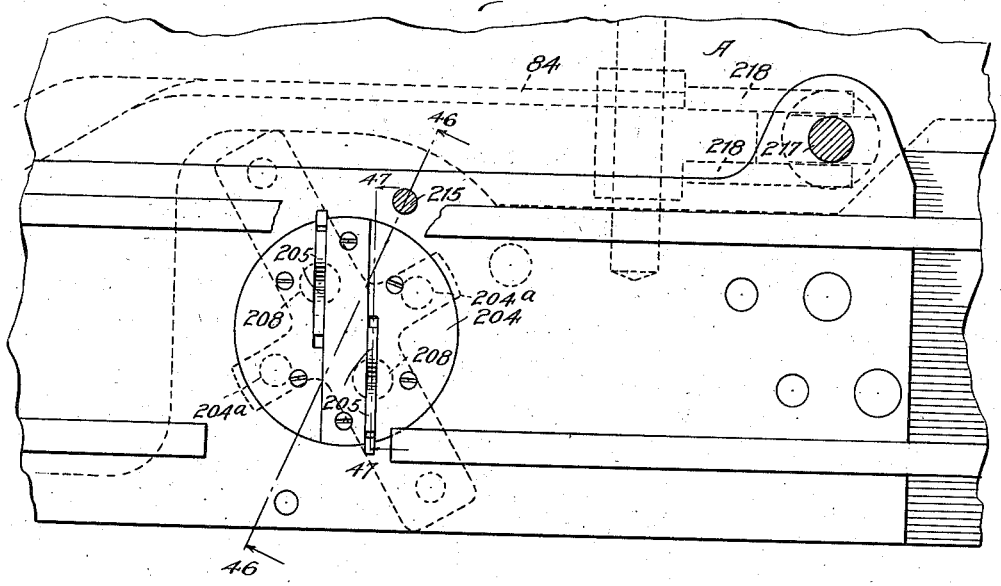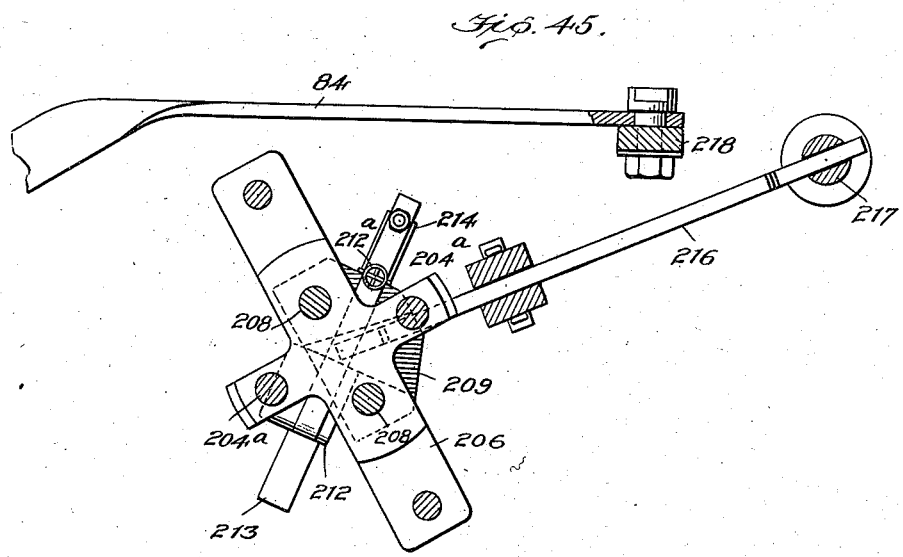

O. F. BALTZLEY.
BOTTLE CAP MACHINE.
APPLICATION FILED SEPT. 28, 1920.
1,415,507.
Patented May 9, 1922.
26 SHEETS—SHEET 17.
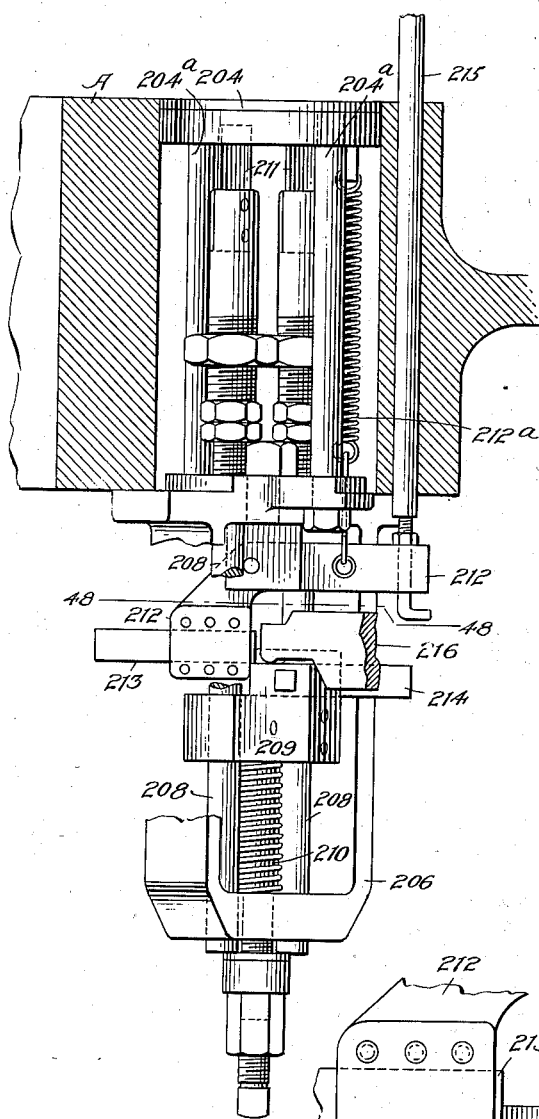
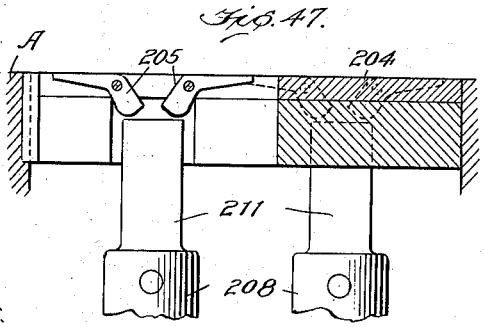
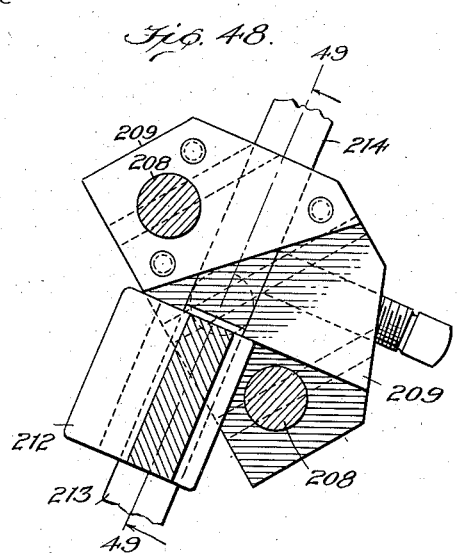
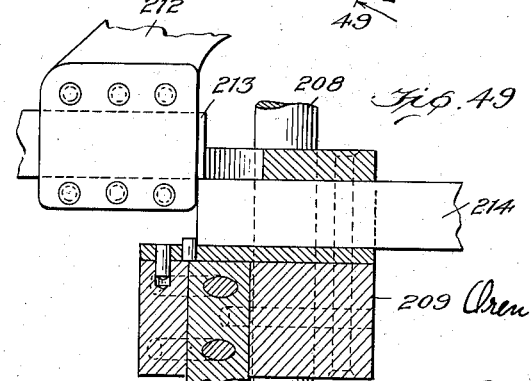

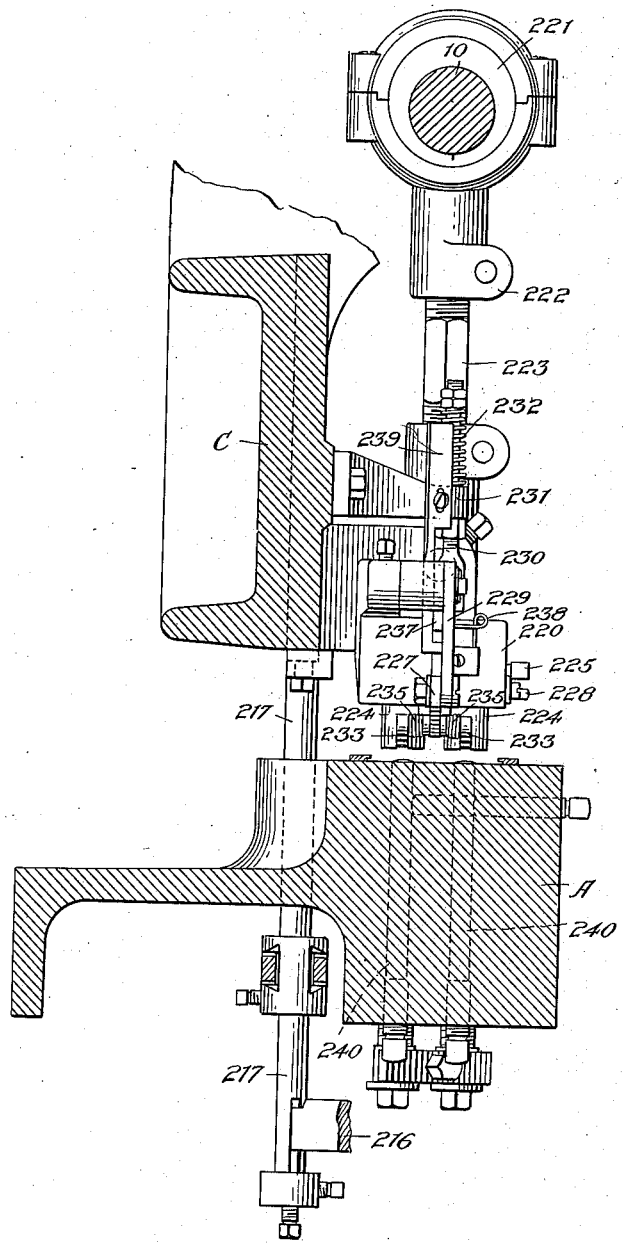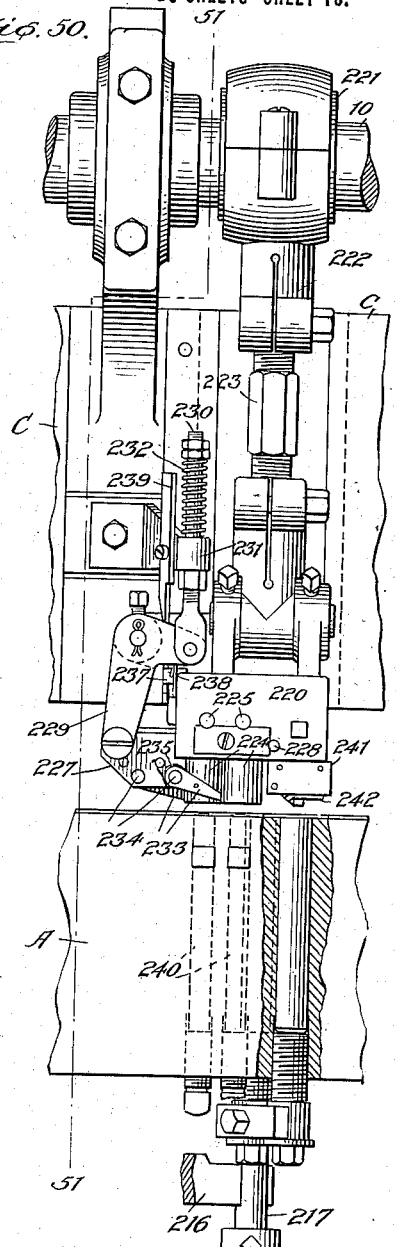

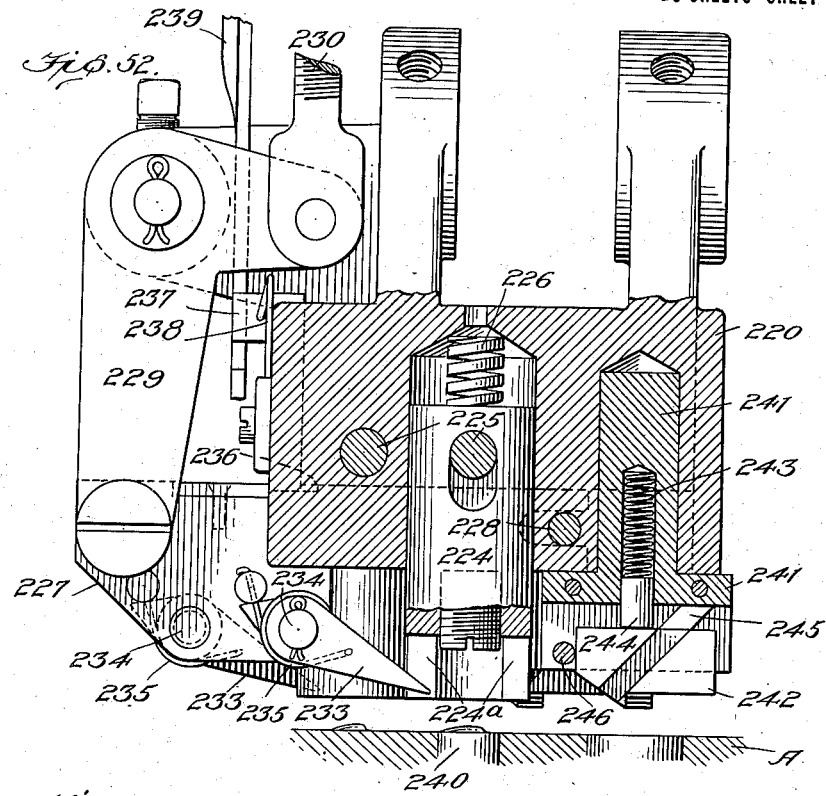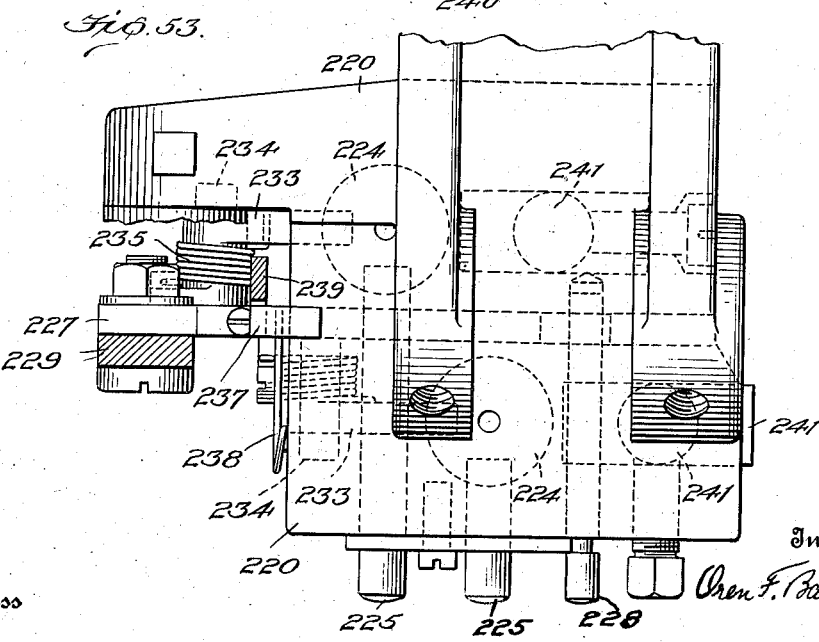

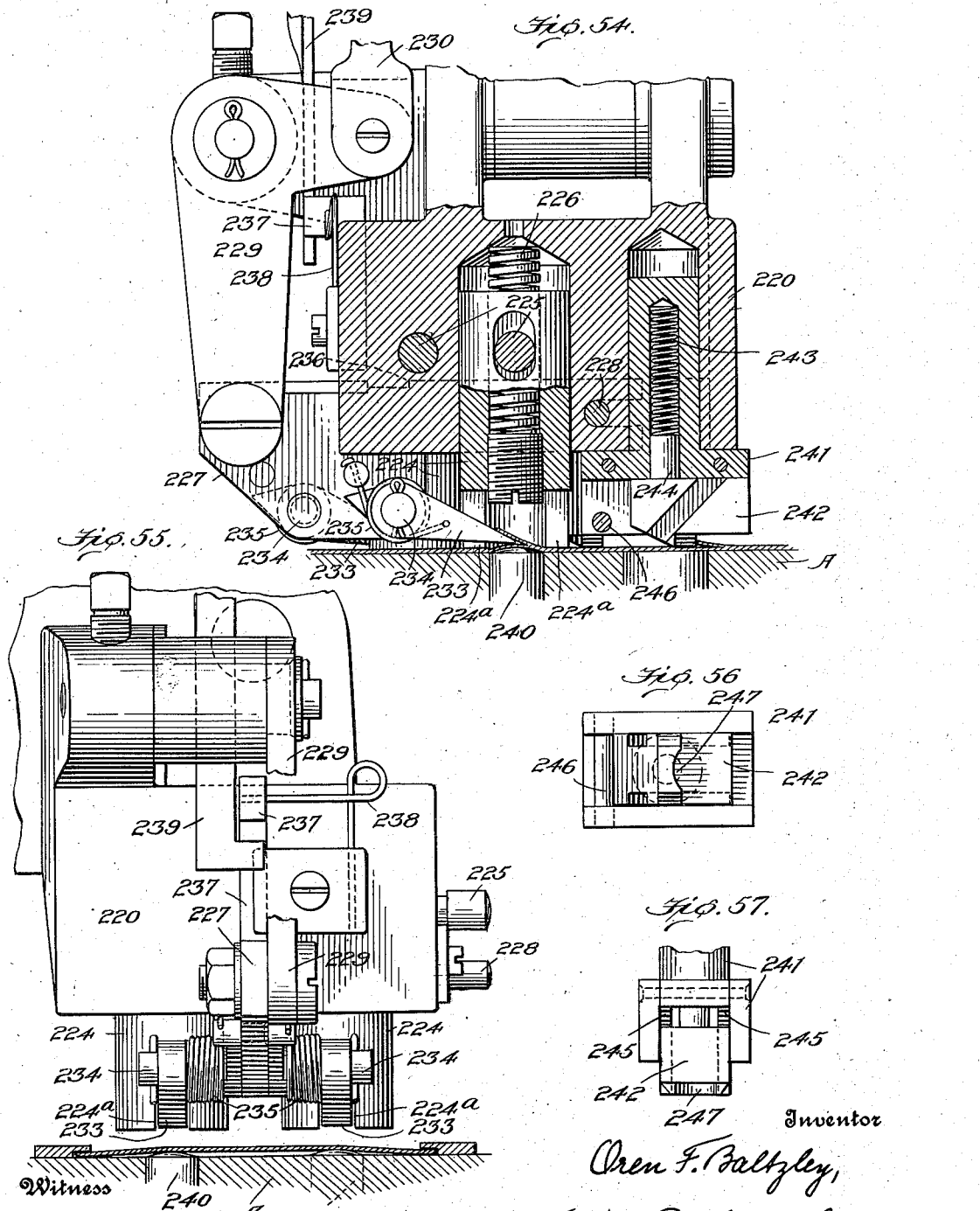

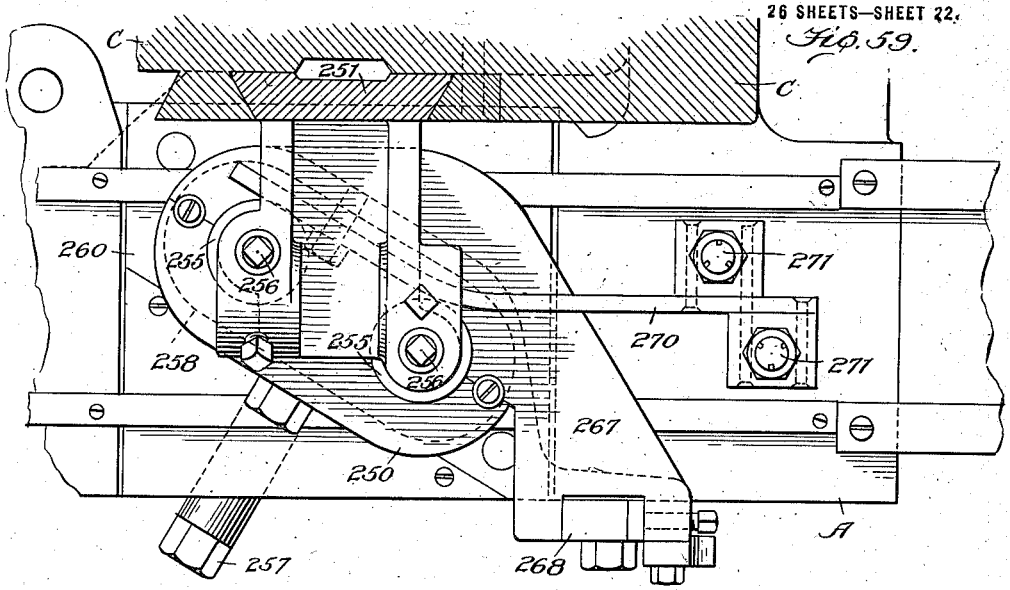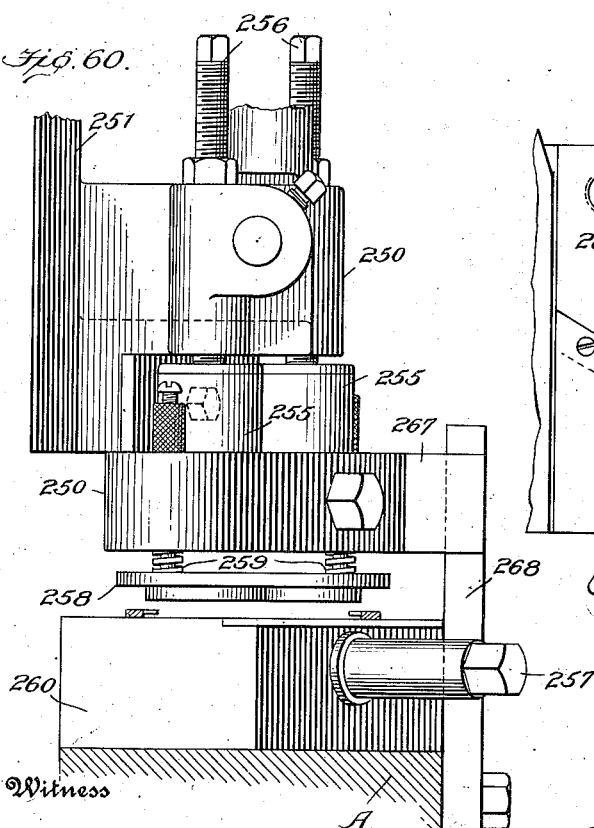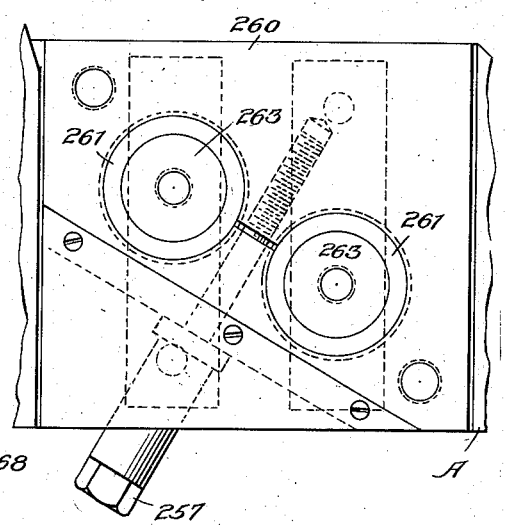

O. F. BALTZLEY.
BOTTLE CAP MACHINE.
APPLICATION FILED SEPT. 28, 1920.
1,415,507.
Patented May 9, 1922.
26 SHEETS—SHEET 23.
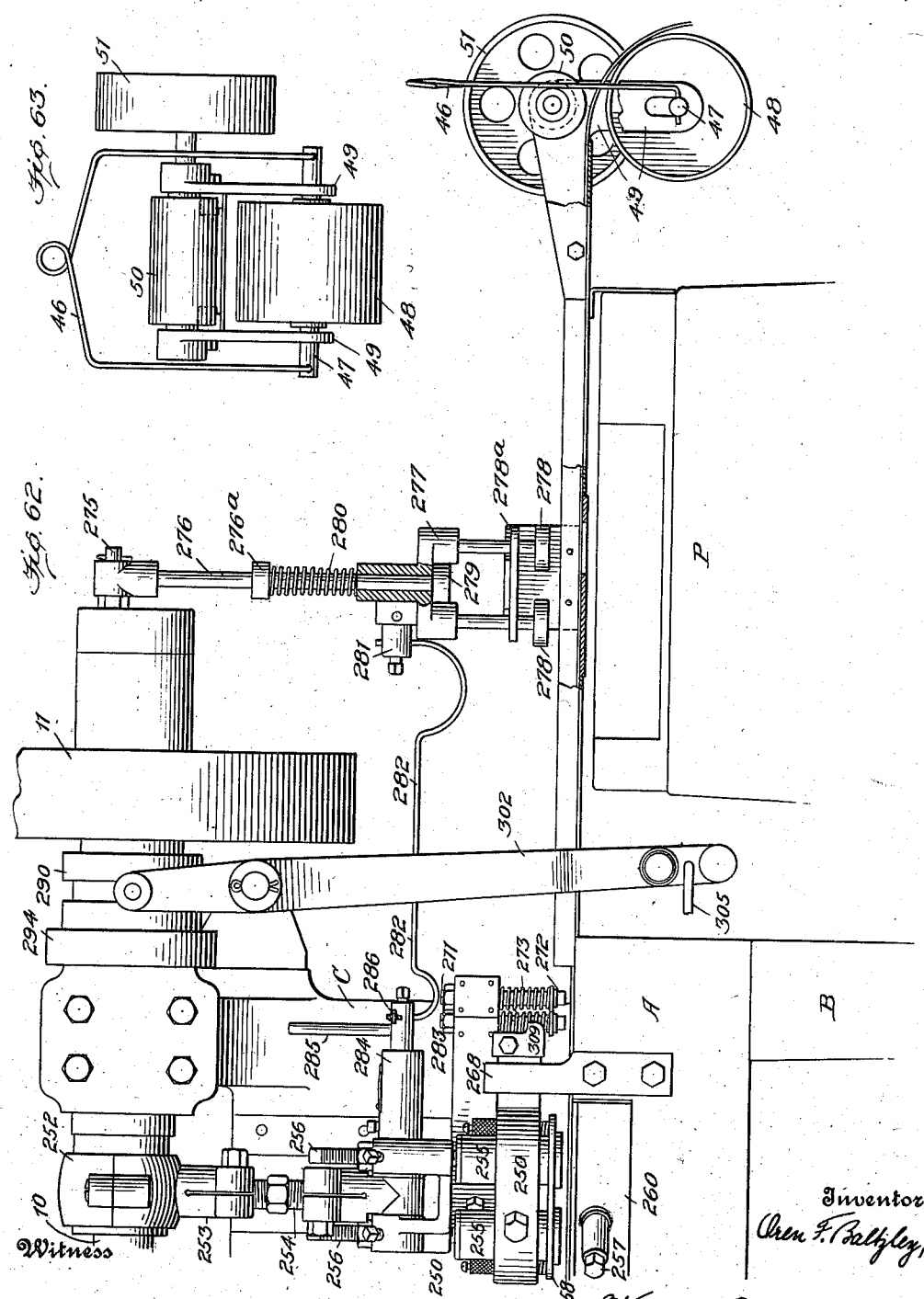

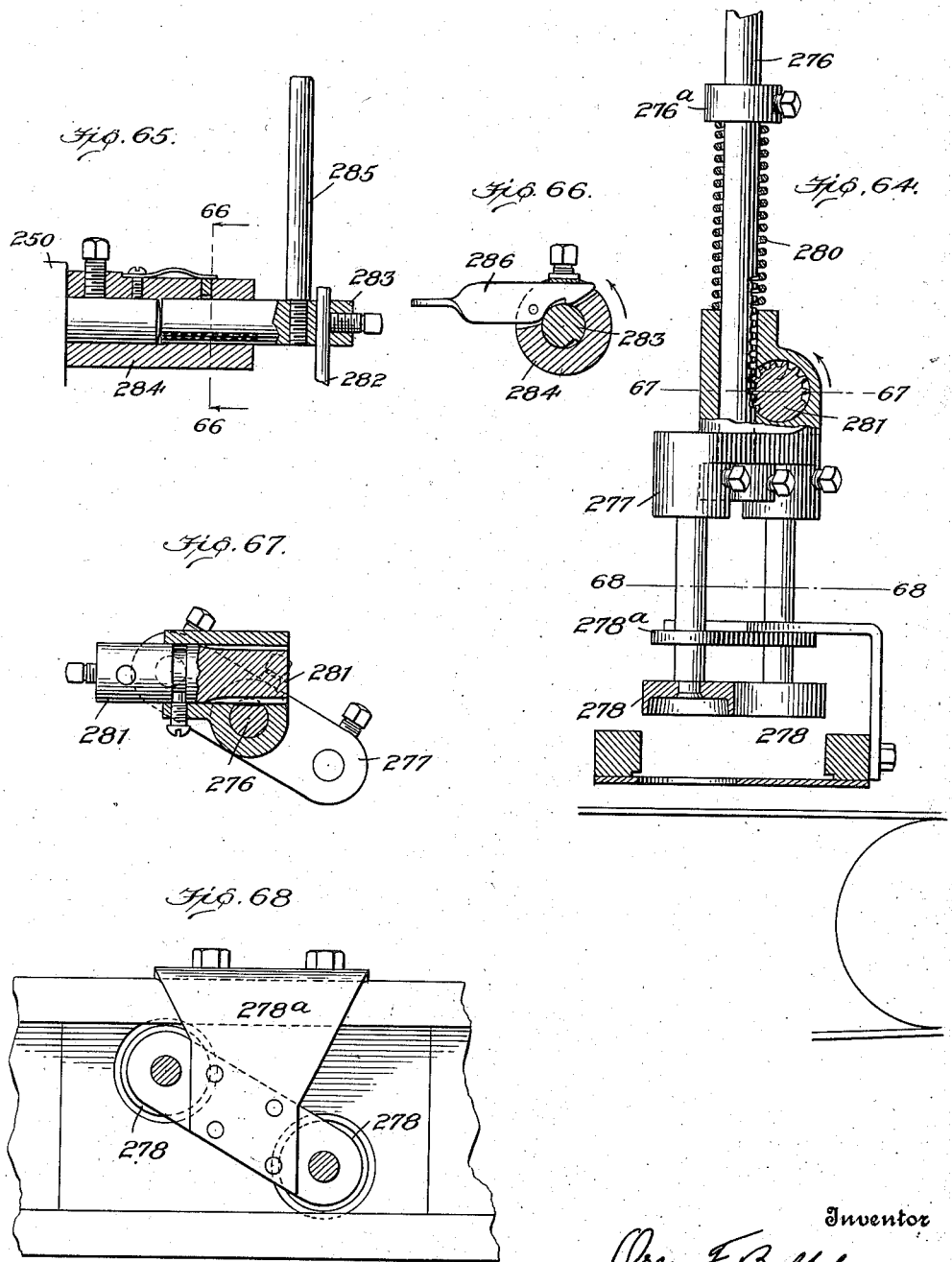

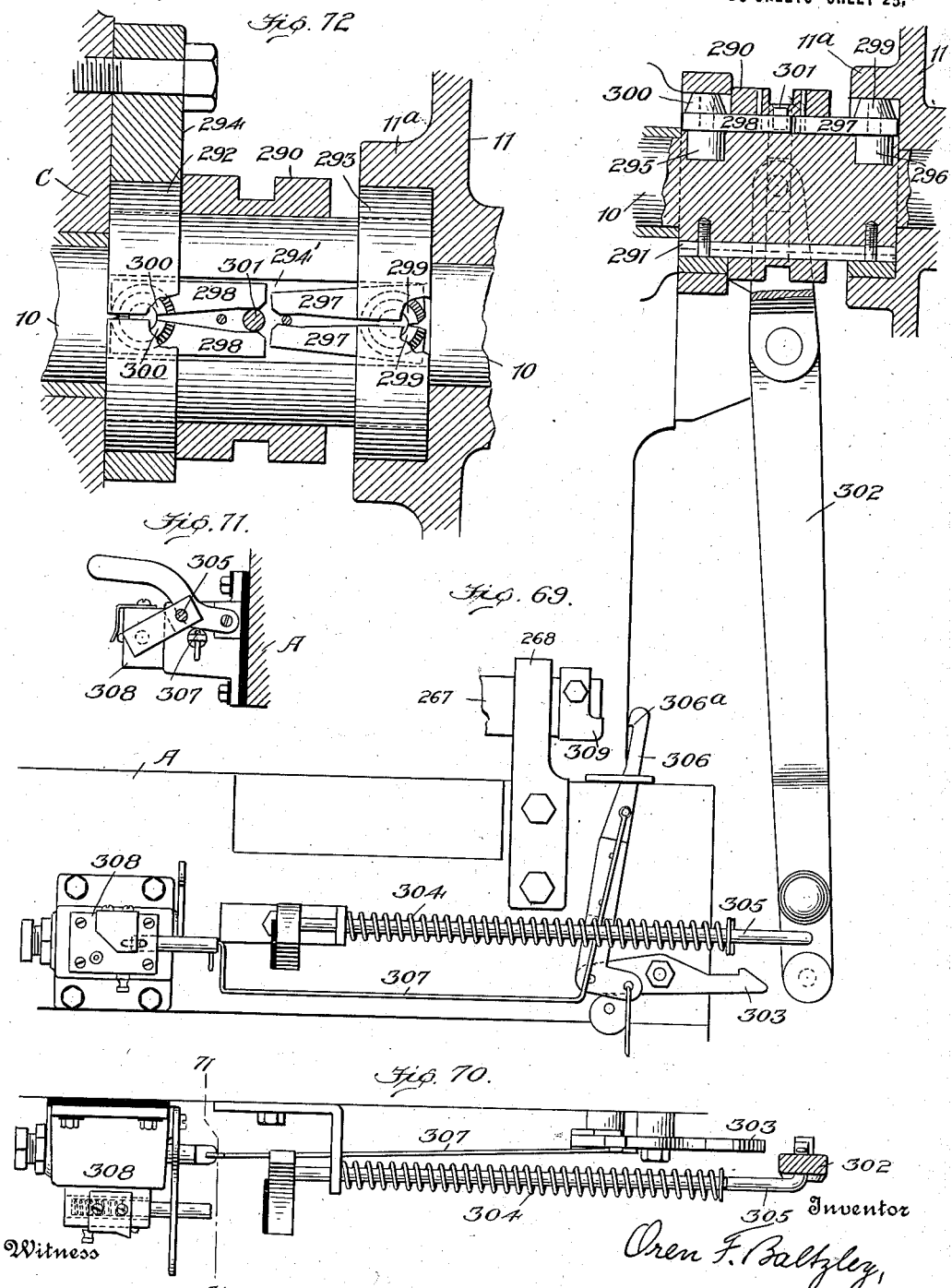

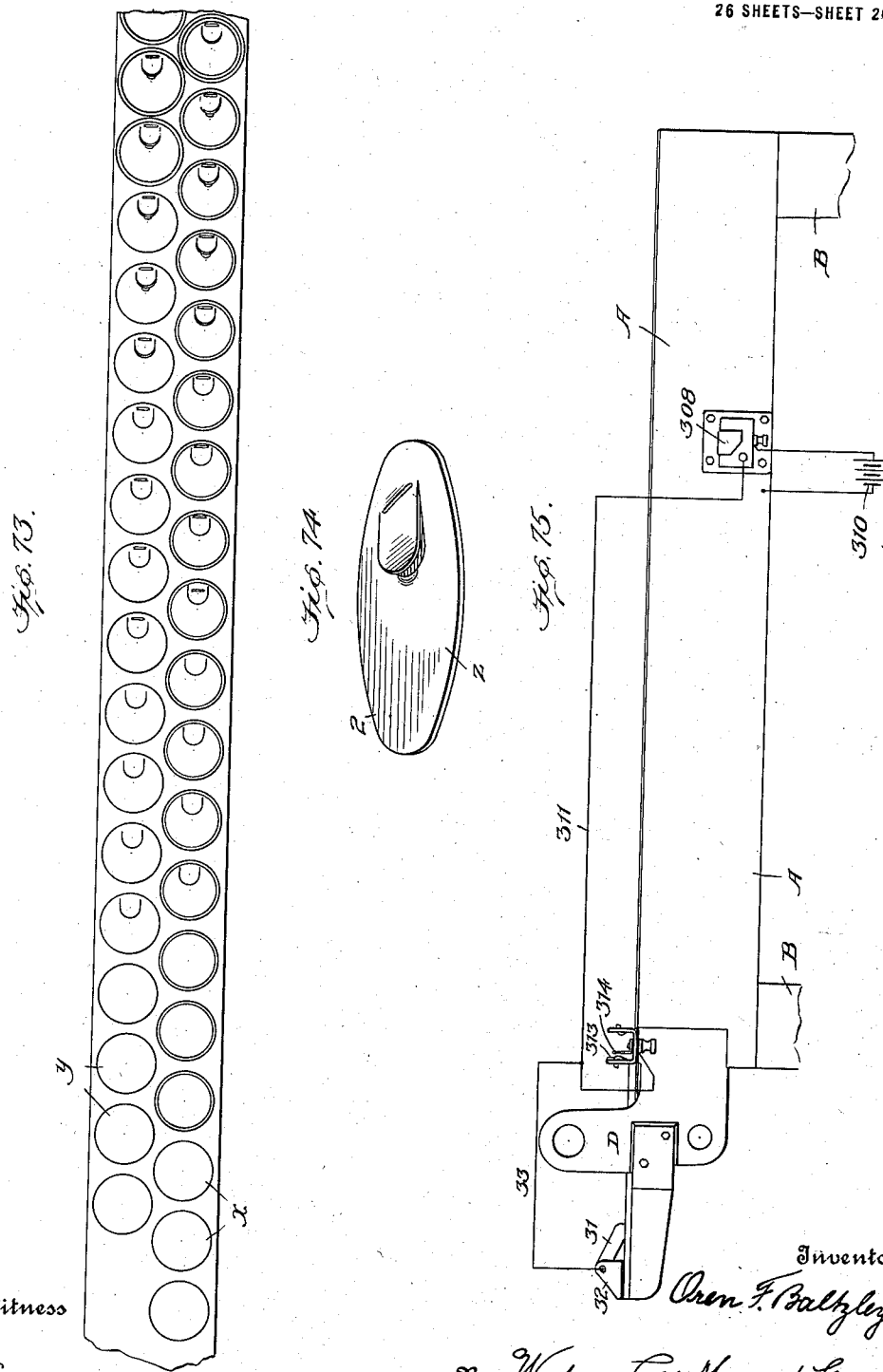

UNITED STATES PATENT OFFICE.

OREN F. BALTZLEY, OF HAGERSTOWN, MARYLAND, ASSIGNOR TO THE SMITH-LEE COMPANY, OF ONEIDA, NEW YORK, A PARTNERSHIP COMPOSED OF WILBERT L. SMITH, HURLBUT W. SMITH, AND THE ESTATE OF M. C. SMITH.

BOTTLE-CAP MACHINE.

1,415,507. Specification of Letters Patent. Patented May 9, 1922.

Application filed September 28, 1920. Serial No. 413,388.

*To all whom it may concern:*

Be it known that I, OREN F. BALTZLEY, a citizen of the United States, and residing at Hagerstown, Washington County, State of Maryland, have invented certain new and useful Improvements in Bottle-Cap Machines, of which the following is a specification.

This invention relates to a machine for making caps or articles of a like character intended for use as closures for bottles or other receptacles. It aims particularly to produce a machine for the manufacture of caps or closures of the character covered by the patent to Charles C. Parker No. 934,832 issued September 21, 1909.

The article disclosed in said patent consists of a disc of suitable material such as pulp board on which a lifting tab is formed, this tab being made by producing a cut of the desired shape which extends part way through the material and splitting the material parallel to the faces thereof within the area defined by the cut. A staple is also applied between the ends of the cut for the purpose of preventing detachment of the tab when the same is used for withdrawing the cap from a receptacle in which it has been placed. The present invention contemplates a machine which will automatically produce this particular article, although in its broader aspect it is capable of embodiment in forms adapted for the production of other articles involving similar principles of construction.

In its more limited aspect the invention aims to produce a machine which includes mechanism for feeding a strip of blank material from which the caps are to be produced and mechanism for making the cuts to form the tabs, for shaping and applying staples to the blank, for splitting the material to produce the lifting tabs and for punching the finished caps from the strip. It may also include mechanism for printing the strip at intervals so that the finished caps may contain printed matter of any desired character and it may further include mechanism for compressing the staples and the tabs flat against the body of the cap and for finally ejecting the finished caps from the strip.

The invention also aims to provide a machine in which the various mechanisms are employed in duplicate, so that strips of material may be used which are of sufficient width to produce a double row of caps.

It is apparent that the details of the foregoing mechanisms may be more or less varied or combined, depending upon the exact nature of the article produced, and it is also apparent that certain of these mechanisms may be omitted entirely, such for example as the printing mechanism or the compressing mechanism and that separate machines may be employed for performing various operations on the blank of material before it is supplied to the machine of the present invention. While, therefore, a complete machine is disclosed which is adapted to produce finished caps from blank material in the form of a strip, it is to be understood that the invention viewed broadly is not limited to the employment of blank material in the particular form referred to or to a construction involving mechanism for performing all of the particular functions heretofore described.

In describing the machine and its operations, various terms are used under the assumption that the machine is to be arranged in a general vertical position as shown in the drawings, but it is to be understood that the relative positions of the parts in space is immaterial. It is to be noted particularly that the term "horizontally" is used in defining the manner of splitting the material of the blank in the formation of the lifting tabs, which term is intended to signify splitting in a direction substantially parallel to the plain faces of the blank, regardless of the position of the blank in space.

The invention in one particular form is described in the following specification and illustrated in the accompanying drawings in which:

Figs. 1 and 1ª together show the entire machine in side elevation;

Fig. 2 is an end elevation of the machine viewed from the left of Figure 1;

Fig. 3 is a sectional view on the line 3—3 of Figure 2 illustrating principally the feed rolls and related parts employed for feeding the strips of material making the caps;

Fig. 4 is a detailed elevational view showing a part of the mechanism used in operating the feed rolls;

Fig. 5 is a plan view illustrating the details of an automatic stop mechanism employed in the machine;

Fig. 6 is a plan view with parts broken away illustrating certain details of the print mechanism;

Fig. 7 is a sectional view on the line 7—7 of Figure 6 illustrating another device for automatically stopping the machine under certain conditions;

Fig. 8 is a sectional view on the line 8—8 of Figure 1 looking toward the right;

Fig. 9 is a detailed view illustrating the ink applying mechanism shown at the lower right hand portion of Figure 8;

Fig. 10 is an enlarged detailed view of the ratchet mechanism employed for operating the ink applying mechanism;

Fig. 11 is a sectional view on the line 11—11 of Figure 10 further illustrating the mechanism for operating the inking roll;

Fig. 12 is a detailed view of a construction employed for supporting and guiding the sprocket chains and inking rolls carried thereby;

Fig. 15 is a sectional view on the line 15—15 of Figure 1 looking in the direction of the arrow;

Figs. 16 and 17 are detailed views illustrating the construction of the bearings employed for supporting the inking rolls;

Fig. 18 is a perspective view illustrating a mechanism intended to contact with and rotate the inking rolls immediately prior to the time such rolls come in contact with the printing surfaces;

Fig. 19 is a sectional view on the line 19—19 of Figure 1 looking in the direction of the arrows and illustrating the mechanism for making the cuts to form the tabs;

Fig. 20 is a view in side elevation of the lower portion of the mechanism appearing in Figure 19;

Fig. 21 is a sectional view on the line 21—21 of Figure 20 looking downward, parts being omitted;

Fig. 22 is a view in elevation of one of the blocks for supporting the cutters used with the mechanism shown in Figure 19;

Fig. 23 is a sectional view on the line 23—23 of Figure 22 looking in the direction of the arrows, this view illustrating the manner of clamping the flexible cutter in the cutter blocks;

Fig. 24 is a section on the line 24—24 of Figure 23 illustrating further details of the means for fastening the cutter in the cutter blocks;

Fig. 25 is a sectional view on the line 25—25 of Figure 1 looking in the direction of the arrows, this view showing the stapling mechanism in end elevation;

Fig. 26 is a plan view of the brake mechanism for cooperating with the wire holding reels;

Fig. 27 is a perspective view of a portion of the mechanism shown in Figure 26;

Fig. 28 is a sectional view on the broken line 28—28 of Figure 25 looking downward, this view illustrating various details of the staple mechanism, the wire feeding mechanism appearing in plan;

Fig. 29 is a view in side elevation of the portion of the mechanism shown in Figure 28, illustrating principally the wire feeding rolls;

Fig. 30 is a sectional view on the line 30—30 of Figure 29 looking in the direction of the arrow and illustrating in elevation certain details of the ratchet mechanism for operating the wire feeding rolls;

Fig. 31 is a sectional view on the line 31—31 of Figure 29;

Fig. 32 is a perspective view showing the guide plates through which the wire is fed by means of the feed rolls illustrated in Figure 29;

Fig. 33 is a view in side elevation partly in section illustrating certain details of the stapling mechanism appearing in Figure 25;

Fig. 34 is a perspective view of one of the combined guide and cutter blocks employed in connection with the staple mechanism;

Fig. 35 is a perspective view of one of the formers over which the staples are shaped;

Fig. 36 is a bottom plan view of the lower portion of the mechanism appearing in Figure 33 and showing various details of the stapling mechanism;

Fig. 39 is a view in elevation of mechanism appearing in Figure 37, certain parts of the mechanism appearing at the right of said figure being omitted;

Fig. 40 is a sectional view on the line 40—40 of Figure 38 looking in the direction of the arrows;

Fig. 41 is a detailed view showing certain portions of the mechanism for forming and attaching the staples;

Fig. 42 is a view similar to Figure 41 showing the parts in a different position;

Fig. 43 is a vertical elevation partly in section showing the portion of the stapling mechanism mounted below the main bed plate of the machine;

Fig. 44 is a plan view of the portion of the mechanism shown in Figure 43, certain of the parts appearing in section;

Fig. 45 is also a plan view of certain parts of the construction shown in Figure 43;

Fig. 46 is a sectional view on the line 46—46 of Figure 44 looking in the direction of the arrows;

Fig. 47 is a sectional view on the line 47—47 of Figure 44;

Fig. 48 is a sectional view on the line 48—48 of Figure 46 looking downward, certain parts being omitted;

Fig. 49 is a sectional view on the line 49—49 of Figure 48 looking in the direction of the arrow;

Fig. 50 is a view in side elevation illustrating the portion of the machine constituting the tab forming mechanism;

Fig. 51 is a sectional view on the broken line 51—51 of Figure 50 looking toward the right and showing the tab forming mechanism in end elevation;

Fig. 52 is an enlarged view partly in section and partly in elevation showing certain details of the tab forming mechanism;

Fig. 53 is a plan view of the portion of the mechanism shown in Figure 52;

Fig. 54 is a view similar to Figure 52 showing the parts in a different position;

Fig. 55 is an enlarged view showing in end elevation part of the mechanism for forming the tabs;

Fig. 56 is a plan view of certain parts of the mechanism appearing at the lower right hand portion of Figure 54;

Fig. 57 is an end elevation of the mechanism illustrated in Figure 56;

Fig. 59 is a plan view of the mechanism appearing in Figure 58, the operating means being omitted;

Fig. 60 is an end elevation of the punching mechanism appearing in Figure 58 viewed from the left in that figure;

Fig. 61 is a plan view illustrating the manner of mounting the punches in the block which carries the same;

Fig. 62 is an enlarged side elevation of the rear portion of the machine;

Fig. 63 is a detailed view in elevation of the rolls employed at the rear end of the machine for drawing out the waste material of the strips;

Fig. 64 is a view in elevation with parts in section showing the construction of the mechanism for ejecting the finished caps from the strips;

Fig. 65 is a detailed view showing certain mechanism for throwing the ejecting mechanism out of operation;

Fig. 66 is a sectional view on the line 66—66 of Figure 65 looking in the direction of the arrows;

Fig. 67 is a sectional view on the line 67—67 of Figure 64 looking downward;

Fig. 68 is a sectional view on the line 68—68 of Figure 64 looking downward;

Fig. 69 is an enlarged view illustrating the automatic clutch mechanism for throwing the machine out of operation under certain conditions;

Fig. 70 is a plan view of the portion of the mechanism appearing at the lower part of Figure 69;

Fig. 71 is a sectional view on the line 71—71 of Figure 70;

Fig. 72 is a plan view partly in section illustrating the detailed construction of the clutch mechanism;

Fig. 73 is a diagrammatic view illustrating the various stages in the formation of the caps from a strip of material;

Fig. 74 is a perspective view of a finished cap;

Fig. 75 is a diagrammatic view illustrating the electrical circuits employed for operating the automatic clutch mechanism.

Figure 13:
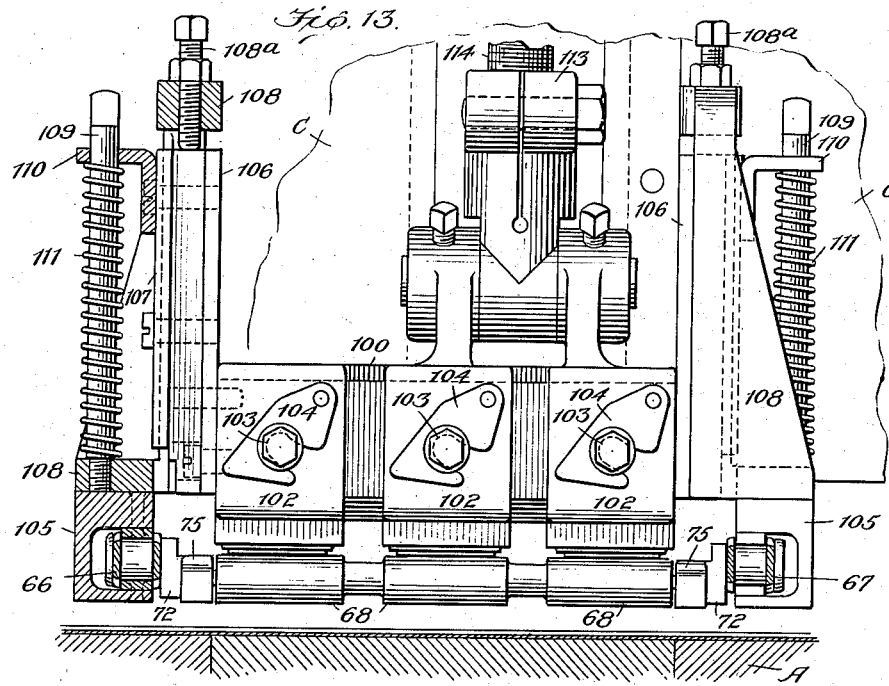
Fig. 13 is a sectional view on the line 13—13 of Figure 8 looking in the direction of the arrows, this view illustrating certain details of the printing mechanism.
Figure 14:
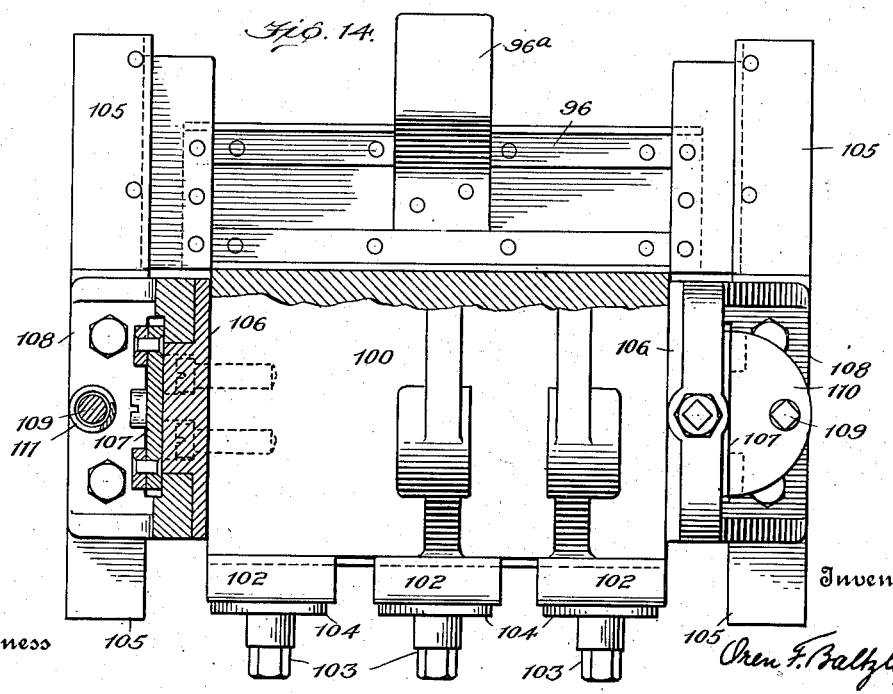
Fig. 14 is a sectional view on the line 14—14 of Figure 8 looking downward and illustrating in plan parts of the mechanism shown in Figure 13.
Figure 37:
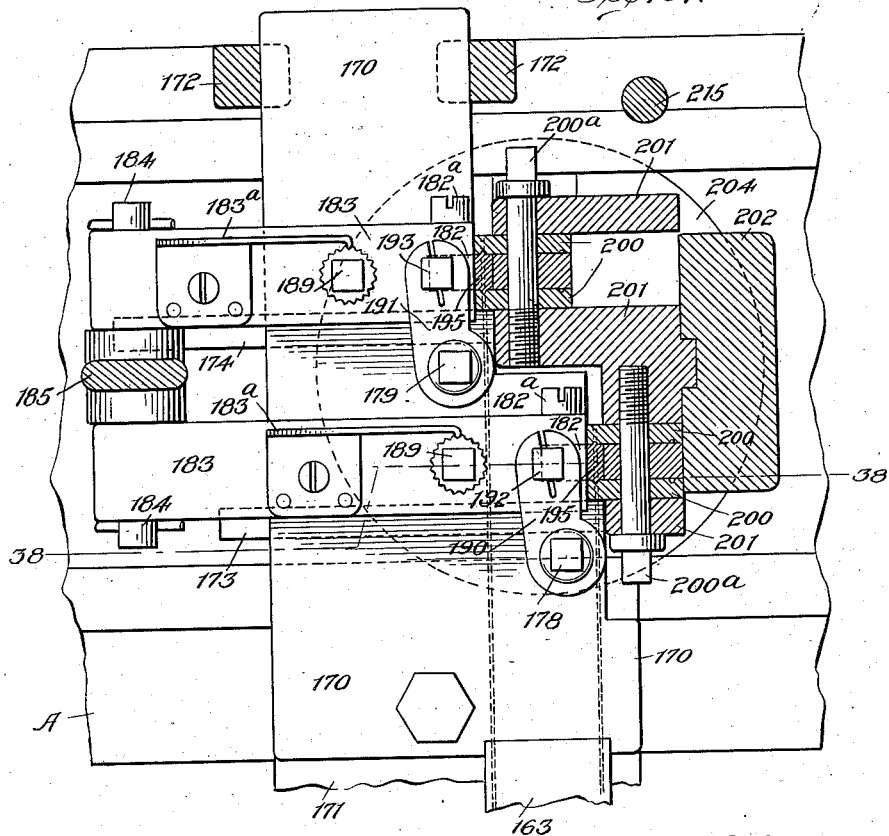
Fig. 37 is a plan view partly in section of the mechanism shown in Figure 38 and illustrating portions of the construction for guiding the staple wire and for cutting the same and forming the staples.

Referring to the drawings in detail A represents the main bed plate of the machine which is supported in elevated position by suitable standards B, B. Mounted above the bed plate of the machine and at one side thereof is a supporting member C which extends the entire length of the bed plate and which at various intervals is provided with bearings in which the main driving shaft of the machine is rotatably mounted. The supporting member C is also provided at intervals with suitable guideways in which various parts of the mechanism hereinafter referred to are slidably supported. The main driving shaft of the machine, represented by the numeral 10, is mounted in the bearings of the supporting member C, as heretofore noted, and this shaft is driven from a pulley 11, Figures 1ª and 62, connected to any suitable source of power. It will be understood that the strips of material from which the caps are to be made, are fed into the machine from the left of Figure 1 and pass over the base plate A between suitable guides and that during its travel through the machine the various operations for making the completed cap are performed on such material.

*Blank feeding mechanism.*

The mechanism for feeding the strips of material will first be described. Two feed rolls 12 and 13 are mounted in arms D and E secured to the base plate A of the machine. The roll 12 is mounted on a bar 14, the ends of which are reduced as at 14ª, Figure 6, such reduced ends being arranged eccentrically to the main portion of the bar and being mounted in the arms D and E. The roll 12 is loosely mounted on the main portion of this bar. Secured to one end of the bar 14 is a lever 15 on which a weight 16 is hung, this arrangement tending to yieldingly force the roll 12 toward the companion roll 13. A gear wheel 17 is rigidly secured to the roll 12 and this gear wheel meshes with a similar gear wheel 18 secured in rigid relation to the roll 13. A rocking arm 19 is mounted adjacent the roll 13, this arm carrying a pawl 20 which is adapted to engage the notches of a ratchet wheel 21 also secured in rigid relation to roll 13 and gear wheel 18. Rocking of the arm 19 rotates the ratchet wheel 21, the gear wheel 18 and roll 13. and due to the engagement of gear wheels 17 and 18, such rotation results in rotation of the roll 12. The arm 19 is rocked by means of a toothed bar 22 which engages a toothed arc-shaped member 23 integral with or secured to the arm 19. The toothed bar 22 is given a reciprocating motion from the main shaft 10 of the machine through the medium of a connecting rod 24 which operates a slidable member 25, mounted in a suitable guideway secured to a fixed part of the machine. The connecting rod is operated from a crank pin 24$^a$ secured to a suitable gear wheel 24$^b$ driven from a gear wheel 24$^c$ secured to the main shaft 10. Means are provided for insuring accurate feed of the material, such means comprising a plate 26, Figure 4. slidably mounted adjacent the toothed bar 22 and yieldingly held in its lowermost position by a spring 27. A pin 26$^a$ secured to the bar 22 engages a slot in said plate 26. The plate 26 is provided with a straight face which is adapted to contact with straight faces formed on the ratchet wheel 21 when said wheel is moved by the arm 19. This construction serves to accurately limit the extent of rotation of the ratchet wheel and the rolls 12 and 13 operated thereby on each movement of the arm 19. The plate 26 is caused to move out of engagement with the ratchet wheel by movement of the toothed bar 22 and the pin 26$^a$ carried thereby. A dog 28 is pivotally mounted upon the standards B of the machine beneath the ratchet wheel 21 and a spring 29 serves to hold this dog in contact with the ratchet wheel. This dog acts as a means to prevent backward rotation of the ratchet wheel 21.

Mounted on the bed plate of the machine or upon an extension thereof in advance of the feed rolls 12 and 13, is a shaft 30, which carries a series of electrical contact members 31. The shaft 30 is supported in standards 32$^a$ formed on a plate 32 which is electrically insulated from the bed plate of the machine. A wire 33 leading to a source of electrical current is connected to the shaft 30 for a purpose hereinafter pointed out.

The shaft 14 carrying the roll 12 is further provided with an arm 40, which is connected by a rod 41 with a bell crank lever 42 suitably secured in an elevated position above the machine. A rod 43 is secured at one end to the bell crank lever 42, and at its other end to a second bell crank lever 44, which is also supported in any suitable position above the machine. A rod 45 serves to connect the bell crank lever 44 with a bail 46 to the lower end of which a rod 47 is secured, which rod carries a roll 48 slidably mounted in guides 49 secured upon a fixed part of the machine. A second roll 50 is mounted above the roll 48 and in cooperative relation therewith, the roll 50 being constantly driven from a suitable source of power such as a band wheel 51. The mechanism just described constitutes means by which the waste material may be drawn from the machine. After the end of a strip of material passes the main feed rolls 12 and 13, the operator by depressing the lever 15 will cause movement of the arm 40 which movement through the rods and bell crank levers as described, will cause the roll 48 to contact with the roll 50 with the result that the strip of material which normally lies loosely between these rolls is grasped and drawn from the machine.

*Printing mechanism.*

After passing the main feed rolls 12 and 13 of the machine, the material is led to the printing mechanism which will now be described. The shafts 60 and 61 are mounted upon suitable arms secured at the sides of the main bed plate of the machine, and sprocket wheels 62, 63, 64 and 65 are mounted upon these shafts. Sprocket chains 66 and 67 engage these sprocket wheels. these sprocket chains carrying at spaced intervals inking rolls 68 which are adapted to contact with and supply ink to the printing forms hereinafter referred to. It will be noted that the shaft 61 also carries an additional sprocket wheel 69, which is connected by a sprocket chain 70 to a second sprocket wheel 71 mounted in the upper part of the support C, the sprocket wheel 71 being driven from a gear wheel which meshes with the gear wheel 24$^b$ previously mentioned.

The inking rolls 68 carried by the sprocket chains are supported in suitable bearings secured to said chains. Each of these bearings comprises a member 72 in which bearing blocks 73 are secured by means of a cross pin 74 (Figures 16 and 17), a flat spring member 75 serving to hold the pin 74 in position. The ends of the rolls are journalled in the blocks 73, and a suitable spacing member 76 is arranged between adjacent inking rolls.

Means are provided for supplying ink to the inking rolls 68, such means comprising a roll 80, Figures 9 and 15, positioned to contact with the rolls 68. A plate 81 is mounted in an inclined position adjacent said roll 80, which plate carries a series of thin flexible plates 82 adjustable by screws 83 toward and from the roll 80. The space between said roll 80 and the flexible plates 82 constitutes a receptacle in which ink is placed. The roll 80 is given a step by step rotary movement by means of a pawl and ratchet mechanism (Figures 10 and 11), which is operated by a reciprocating bar 84 to which movement is imparted by mechanism hereinafter described. The bar 84 carries a plate 84$^a$ on which a grooved disk 85 is mounted, this disk carrying a threaded stud 86 which passes loosely through the bar 84 and plate 84$^a$, being secured in position by a nut 87. The shaft of the roll 80 has secured thereto a ratchet wheel 88 with which a pawl 89 co-operates, this pawl being mounted upon a plate 90 which is given a reciprocating motion through the medium of a pin 91 which engages in the grooves of the disk 85. The disk 85 can be adjusted about the axis thereof so that the desired amount of movement will be given to the pin 91, the dog 89, the ratchet wheel 88 and the ink supplying roll 80. Arranged between the lower runs of the sprocket chains 66 and 67 are a series of plates 92 yieldingly supported on a suitable framework, Figure 12, consisting of a series of transverse bars 93 secured to hangers 94 attached to a fixed part of the machine. Suitable guideways 95 for receiving the sprocket chains 66 and 67 are also carried by said framework. The yieldingly supported plates 92 are so positioned that the inking rolls 68 come in contact therewith after passing the roll 80, such plates constituting means for rotating said inking rolls and spreading the ink thereon. Mounted between the upper runs of the sprocket chains 66 and 67 and adjacent the movable head, hereinafter referred to, for carrying the printing forms, there is a member generally designated as 96, Figure 18, which consists of a flat plate provided with a handle 96$^a$ by which it can be inserted and removed from suitable slots formed for its reception in adjacent parts of the machine. This member 96 is so positioned as to contact with the inking rolls 68 and rotate the same just prior to the time they come in contact with the printing forms.

Arranged above the sprocket chains 66 and 67 there is a reciprocating head 100 which is slidably mounted on the support C and which is adapted to support the printing forms that contact with and print the strip of material passing beneath the same. Such printing forms are designated by the numeral 101, and these forms are secured in position upon the head by means of clamping plates 102 secured to said head by bolts 103, these bolts being locked against rotation by latches 104 pivoted to the clamping plate 102. The printing forms may carry any desired character of printed matter and if desired they may be arranged so that the caps in one row at least may be given two impressions from said forms, thus making it possible to print some of the caps in a plurality of colors. The reciprocating head 100 carries near its lower end two guide members 105 in which the sprocket chains 66 and 67 are adapted to travel. The guide members 105 are yieldingly supported with reference to the head 100. To secure such yielding support, the head 100 carries guide plates 106 to which plates 107 are secured, the plates 106 and 107 being so arranged that a guideway is formed between the same. The guide members 105 carry plates 108 which are secured thereto and which are provided with portions adapted to slide in the guideway formed between the plates 106 and 107 secured to the head 100. The upper portion of said plates 108 overhang the upper end of plates 106, and set screws 108$^a$ secured in said overhanging portions are adapted to contact with said plates 106 to limit the downward movement of said plates 108 and the guide members 105 secured thereto. The guide members 105 also carry standards 109, which pass loosely through plates 110 secured to the plates 107 of the head 100. Coiled springs 111 are arranged about the standards 109 between the guide members 105 and the plates 110, these springs constituting means by which the guide members 105 are yieldingly held in a position somewhat below the surfaces of the printing forms. The construction described, however, permits said guide members 105 to yield so that the printing forms may move into contact with the strip of material passing beneath the same. The head 100 is operated from the main shaft 10 of the machine by means of a suitable eccentric mechanism 112 connected to said head through the medium of a suitable connecting rod 113 containing the threaded member 114 by which the length of the connecting rod may be accurately adjusted. It is to be understood that the movements of the head 100 are so timed with reference to the movement of the sprocket chains 66 and 67 carrying the inking rolls 68, that the head will descend to perform the printing operations on the strip at the intervals when the inking rolls 68 are not positioned beneath the head.

*Tab cutting mechanism.*

After passing the printing mechanism heretofore described, the strip of material is led past a mechanism which is designed to make cuts in the material in preparation for the formation of the tabs. This mechanism comprises a head 120 which slidably engages in a suitable guideway formed in the support C, this head being given a reciprocating motion toward and from the bed plate A by means of an eccentric mechanism 121 arranged about the main shaft 10 and connected to said head by means of a connecting rod 122, the length of said connecting rod being adjustable by means of a member 123 provided with right and left hand screw threads which engage in separate parts of said connecting rod. Mounted in the reciprocating head are two cutter blocks 124, to the lower ends of which the cutters are secured. The reciprocating head also carries two adjusting screws 125 which are adapted to bear against said cutter blocks 124 and constitute means by which their position in the head may be accurately adjusted. The cutter blocks are held in the head by means of a clamping bar 126, which is secured to the head by means of a bolt 127.

Each of the cutter blocks consists of two members, 128 and 129, as illustrated in Figures 22 to 24 inclusive, the former comprising a base portion 130 and two upright portions between which the member 129 is mounted, the two parts being pivoted together at their ends by a pin 131 extending through the same. At its lower end the member 128 is provided with a U-shaped recess into which the member 129 is adapted to fit sufficiently closely to clamp a flexible knife 132 in such U-shaped recess, this knife being formed of a straight piece of metal which is forced into the space between the two members of the cutter block. After said knife is placed in position, the two members of the cutter block are held together by means of a bolt 133, passing through the same. One of the members of the cutter block is provided with a pin which engages a notch in the cutter by which movement of the cutter in the block is prevented. It will be understood that the cutter is of such dimension as to project a slight distance below the end of the cutter block, and this cutter is intended to make a cut in the material extending between two separated points, and also extending part way through the same, the base portion 130 of the member 128 serving to limit the depth of such cut.

*Stapling mechanism.*

After being cut in the manner described the strip of blank material passes to the stapling mechanism now to be described. A U-shaped frame F, F is carried by the main support C of the machine and to the upper part of this frame, an arm 140 is secured. This arm carries a rod upon which wire holding reels 141 are rotatably mounted. Beneath said reels, arms 142 are pivotally connected to the arm 140 the arms 142 being connected by a cross bar 142ª. Each of the arms 142 carries a brake member 143 which is adapted to bear against said reels, a coiled spring 144, connected at one end to the cross bar 142ª and at its other end to an arm rigid with arm 140, tends to hold said brake members against the reels. At their outer ends, the pivoted arms 142 carry long curved tubular wire guides 145 which serve to direct the wire from the reels to the wire feeding mechanism to be later described. It will be understood that as the wire is drawn by the wire feeding mechanism through the guides 145, the arms 142 are caused to move about their pivots on the arm 140 with the result that the brake members are moved out of contact with or bear with less force on the reels so that the wire may be easily unwound therefrom. When, however, no pull is exerted on the wire by the wire feeding mechanism, the spring 144 will hold the brakes in contact with the reels and prevent unwinding of the wire.

The wire feeding mechanism comprises two feed rolls 146 and 147 mounted on shafts supported in any suitable manner as by arms G extending from the base plate A, each of said rolls having two wire feeding grooves formed in the surface thereof. Gear wheels 146ª are secured to the feed roll 146, and similar gears 147ª are secured to the feed roll 147, each of said gears 146ª meshing with one of the gears 147ª. A ratchet wheel 148 is also secured in rigid relation to the feed roll 146 so that as said ratchet wheel is rotated the roll 146 and gears 146ª are caused to rotate, which results in rotation of the roll 147. An arm 149 is loosely mounted on the shaft carrying the roll 146 and adjacent the ratchet wheel 148, said arm carrying a pawl 150 held by spring 150ª in engagement with the teeth of said wheel. The pawl is provided with a straight face portion 150ᵇ (Figure 30) adapted to contact with a pin 151 secured in fixed position on the arm G, this arrangement constituting means for accurately limiting the movement of the pawl and ratchet wheel and the feed rolls which receive motion therefrom. The arm 149 is given a reciprocating movement by means of a suitable eccentric mechanism 152 to which a connecting rod 153 is attached, this rod engaging loosely in an opening in the member 154 rotatably secured to the arm 149, as by means of a key 155. A coiled spring 156 surrounds the rod 153 which carries an abutment member 157 and the spring 156 is confined between said abutment and the member 154. This construction provides a yielding arrangement for operating the wire feeding rolls 146 and 147. The roll 147 is rotatably mounted upon a shaft or rod which is provided with reduced eccentric portions 158 (Figure 31) said reduced portions constituting the bearing portions of the shaft. Arms 159 are secured to the ends of said shaft or rod and weights 160 are hung on said arms by means of chains, 161. This construction causes the roll 147 to be yieldingly held against the companion roll 146.

After leaving the wire guides 145, the wires are led through suitable openings in a stationary plate 162 and after passing this plate they travel between the guide plates 163, 164, suitable passageways being provided for that purpose. The plates 163, 164 are cut away as shown in Figure 32, the rolls 146 and 147 lying in such cut away portions and contacting with the wire to feed it through these plates and to the other mechanism.

Figure 38:
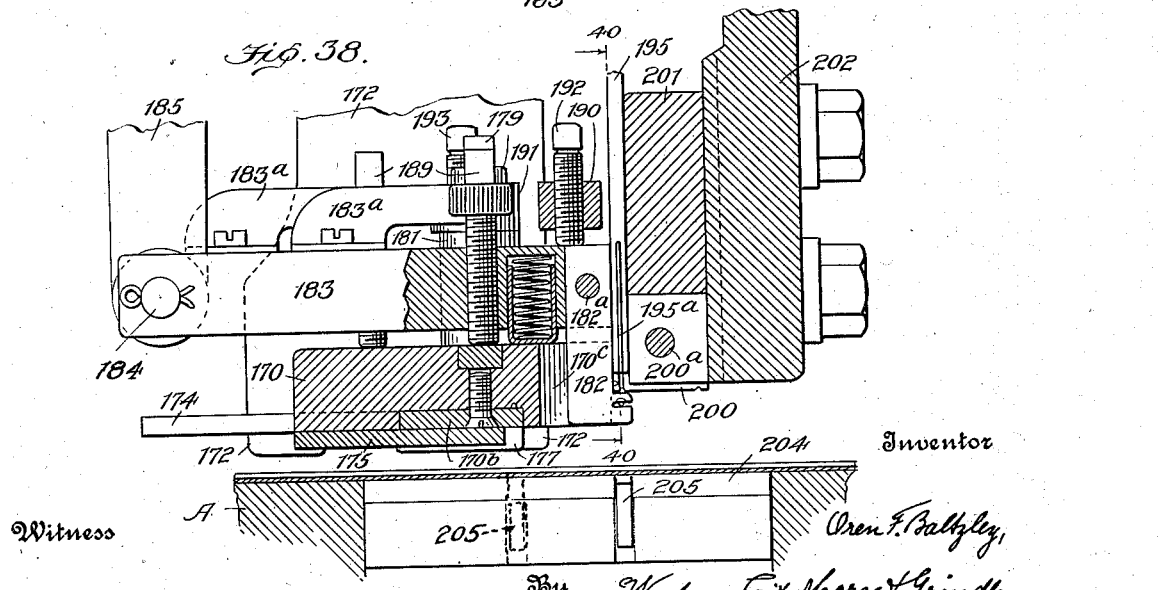
Fig. 38 is a sectional view on the broken line 38—38 of Figure 37.
Figure 58:
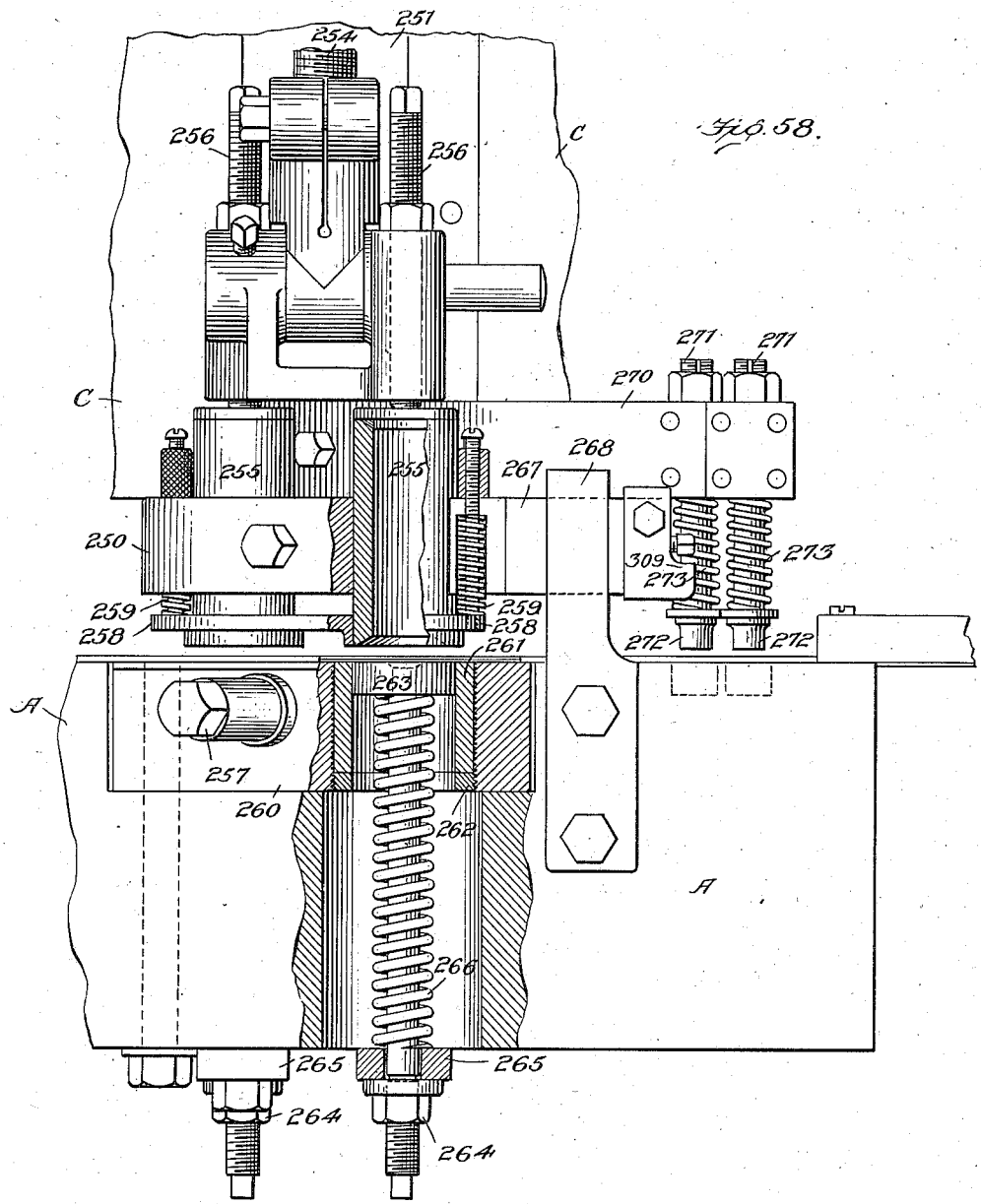
Fig. 58 is a side elevation of a portion of the machine showing the mechanism for punching the finished caps from the strip and forcing the same back into the strip, and also showing the means for finally pressing the staples and tabs into place.

After leaving the guide plates 163 and 164 the wires pass to a guide plate 170, supported at one end by a plate 171 mounted on the base plate A of the machine and at its opposite ends in hangers 172 rigidly secured to the main support C of the machine. On its under side (Figures 36 and 38) the plate 170 is provided with grooves in which plates 170$^a$, 170$^b$ are mounted, suitable passage ways for the wires being formed between these plates and the plate 170. The plate 170 is also provided with narrow grooves in which bars 173, 174 are mounted, these grooves being covered by a plate 175 also secured beneath the plate 170. The bars 173, 174 constitute the members against which the wires are cut. Other plates 176 and 177 are secured beneath the plate 170 by means of bolts 178, 179 which extend through tubular standards 180, 181 on top of the plate 170 and through openings in said last named plate. It will be observed that the plate 170 on one edge is provided with two rectangular recesses 170$^c$ and 170$^d$, the parts being so arranged that the wires emerge from the guideways of the plate 170 adjacent the outer ends of these recesses. When the plate 170 is in position each of these recesses receives a staple forming device 182 (Figures 35, 40) each provided with a groove 182$^b$ in which the wire is intended to lie when being shaped to form a staple. The staple formers 182 are supported in arms 183 by pins 182$^a$, said arms being mounted at their other ends on a common shaft 184, supported in a reciprocating hanger 185 pivoted to the main support C, this hanger being provided with a roller 186 adapted to contact with a cam member 187 secured to a reciprocating part of the machine. A spring 188 holds the roller in contact with the cam member 187. Each of the arms 183 carries a bolt 189 which passes therethrough and rests upon a hardened bearing block fixed in the upper surface of plate 170, each bolt being held from rotation by a locking member 183$^a$. By this construction the position of the arms 183 and the staple formers 182 carried thereby, can be accurately adjusted. It will be understood that as the arms 183 are caused to reciprocate, the formers 182 are caused to reciprocate, the formers 182 move in the recesses in the plate 170, toward and from the line of feed of the wires. On the top of the tubular standards 180, 181 there are mounted arms 190, 191 secured thereto by the bolts 178 and 179 and said arms carry adjustable bolts 192, 193 so positioned as to contact with the upper ends of the formers 182.

The parts of the mechanism are so timed that as the wires are fed forward by the wire feeding rolls, the staple formers 182 will be in position to receive the wires in the grooves 182$^b$. After the wires are fed through these grooves, portions of the same are cut off and formed into staples and driven into the material located beneath the formers. These results are accomplished by the following mechanism. Adjacent each former there is mounted a plunger 195 which plungers are given a reciprocating motion from a slide 196 (Figures 28 and 33) carrying a pin which engages a groove in a cam disk 197 secured to the shaft 10. It may be noted that the cam member 187 heretofore mentioned, is also connected to said slide 196, and is moved thereby. The plungers 195 are provided at each of their edges with guide ribs 195$^a$ and slidable members 200 are positioned to engage these guide ribs, there being two of these members for each plunger. The slidable members 200 are secured by bolts 200$^a$ to a reciprocating head 201 attached to a slide plate 202 which carries a pin positioned to engage a cam groove in a cam 203 secured to shaft 10. Each of the slidable members 200 is provided with suitable grooves for engaging the ribs 195$^a$ on the plunger 195, and as will appear from Figure 34, each of said members is so grooved as to make it reversible, which enable different faces thereof to be used as the operating portion. The parts are so timed that after the wires are fed forward the desired distance through the formers 182, the slidable members 200 descend. These members cut the wires and as they continue to descend the severed portions of wire are bent over the formers 182, as shown in Figure 41, to form the staples, the branches of the staples lying in the grooves of said members 200. After the staples are formed, the formers 182 move away while the slidable members carrying the formed staples and also the plunger 195 move toward the material positioned beneath the same. When the slidable members 200 reach their lowermost position, the plungers 195 continue their motion with the result that the staples are forced by such plungers through the material.

Means are provided for clenching the staples after they are forced through the material. Below the staple forming mechanism the base plate A of the machine is provided with an opening in which a circular slotted plate 204 is mounted and to which two sets of anvil members 205 are pivotally secured. Mounted in a framework 206 secured beneath the base plate A of the machine are two rods 204$^a$ which support the plate 204 and two other rods 208 which slidably engage said framework the rods 208 being rigidly secured to a block 209. Between said block and the lower portion of the framework 206 there is mounted a coiled spring 210 which tends to force the block and the rods 208 upwardly. The upper ends of said rods are provided with flat portions 211 which are positioned to engage the anvil members 205. A locking lever 212 is pivoted to the framework 206 which lever carries a contact member 213 adapted to engage a contact member 214 secured in the block 209. The locking lever to which spring 212$^a$ is secured serves to hold the block 209 and the rods 208 in their lowermost position against the action of spring 210. When said lever is caused to move about its pivot the parts are released with the result that the flat portions 211 of the rods 208 contact with the anvil members 205 causing the same to move about their pivot points and contact with and clench the staples which have been driven through the material. The lever 212 is released from engagement with block 209 at proper intervals by means of a push rod 215 operated from the slide 202 heretofore mentioned. After the action just described has taken place, the block 209 and rods 208 are again moved downward to permit the locking lever to catch and hold the same, such downward movement of these parts is produced by means of a lever 216 pivoted to the base plate A and operated from a push rod 217 connected to a slide which operates a part of the machine later to be described. Said push rod by means of the bell crank lever 218 also operates the reciprocating bar 84 which as heretofore described, operates the ratchet mechanism for rotating the ink applying roll 80.

*Tab forming mechanism.*

After receiving the staples, the material is next caused to pass beneath the tab forming mechanism which will now be described. A reciprocating head is arranged above the head plate A of the machine, this head being secured to a member which slides in a guideway in the support C. The head 220 is reciprocated by means of an eccentric mechanism 221 mounted on the main shaft 10, said mechanism and the head being connected by a connecting rod 222 which includes a threaded member 223 by which the length of the connecting rod may be adjusted. On its under side the head 220 is provided with two cylindrical recesses in each of which a hollow cylindrical plunger 224 is slidably mounted. These plungers are each slotted at one side and pins 225 mounted in said head 220 engage in said slots. This arrangement permits limited movement of the plungers in the recesses. A coiled spring 226 is mounted in each of the hollow plungers and bears against the bottom of the corresponding recess, these springs tending to force the plungers outwardly. At their lower ends the plungers are bifurcated, as shown at 224$^a$, for a purpose which will presently appear.

The head 220 is slotted at its lower end and a plate 227 slides in this slot, said plate 227 at its inner end being bifurcated to engage a pin 228 mounted in the head. At its outer end plate 227 is pivotally connected to a bell crank lever 229 pivotally mounted on said head 220. A rod 230 is pivotally connected to the other end of said bell crank lever and this rod slidably engages a guide member 231 fixedly secured to the main support C. A coiled spring 232 surrounds said rod 230 and is arranged between the guide member 231 and a nut mounted on the end of said rod. This spring tends to draw the rod 230 upwardly and cause the lower end of the bell-crank lever 229 to move toward the head 220. The plate 227 carries two wedge-shape splitting tools 233 each of which is adapted to move in the bifurcated portion of one of the plungers 224. The splitting tools 233 are mounted upon short stub shafts 234 secured to plate 227, coiled springs 235 being arranged about such shafts and secured to the splitting tools, these springs serving to yieldingly support the free ends of said tools.

The upper edge of the plate 227 is provided with a shoulder 236 and a locking plate 237, slidably mounted in the head 220, is adapted to engage this shoulder. The plate 237 is held down and in engagement with said shoulder by a spring 238. A projection on the plate 237 is so positioned as to strike a projection on a fixed contact plate 239, with the result that in a certain position of said head 220, the locking plate is withdrawn from engagement with the shoulder 236 on the plate 227. This condition arises substantially at the time the head 220 reaches the lower limit of its movement and after the plungers 224 have come in contact with and clamped the material which is positioned thereunder. When the locking plate is thus withdrawn, the spring 232, which is then compressed, causes sudden movement of the bell crank lever 229 about its pivot point, the result being that splitting tools 233 are projected into the bifurcated portions of the plungers 224 and into contact with the material held thereby.

Mounted in the base plate A of the machine and in line with the hollow plungers 224, there are two bars 240 which are adjustably supported and which are intended to project at their upper ends a slight distance above the bed plate A and into contact with the material. Said ends of the bars 240 are so shaped that when the plungers clamp the material, these ends cause the same to be slightly elevated or bent up at the points where they contact with the material. The mechanisms of the machine are so timed and arranged, that the parts of the material so elevated are the parts included in the cuts heretofore described, and such elevation facilitates engagement of the splitting tools with the material and also causes more or less breaking of the material adjacent the cuts which also assists the operation of the splitting tools.

It will thus be seen that the splitting tools serve to split and lift the portions of he blank material defined by the cuts heretofore described so that tabs are formed thereon.

At its rear portion the head 220 is recessed for the reception of holders 241 in which slidable members 242 are mounted, each of the holders 241 is provided with a bore in which a coiled spring 243 is arranged, this coiled spring resting upon a cylindrical portion 244 formed on each slidable member 242. These springs tend to urge the slidable members 242 outwardly. Each of the holders 241 is provided at each side with diagonally arranged guideways 245 and the slidable members 242 are diagonally slotted to engage such guide members In each of said holders a pin 246 is arranged transversely of the holder against which the slidable members 242 are adapted to contact to limit the extent of their outward movement. Each of the slidable members on its under surface is provided with a shoulder 247 which is slightly curved at one point (Figures 56 and 57) for a purpose hereinafter explained. It will be apparent that as the head 220 descends and the slidable members 242 come in contact with the material, such members will be caused to move a limited extent longitudinally of the material. The parts of the mechanism are so arranged that as said slidable members 242 move longitudinally along the surface of the material, they will contact with the tabs which have been lifted by the mechanism heretofore described, and will slightly roughen or mutilate the ends of said tabs, such mutilation being provided for the purpose of facilitating grasping of the tabs in withdrawing a cap from a receptacle in which it is placed. The slidable members 242 are also designed to compress the body of the material adjacent the ends of the tubes for the purpose of facilitating the grasping of the tabs in the operation of removing a cap from a receptacle.

*Punching mechanism.*

The mechanism for punching the completed caps from the material will now be described.

A reciprocating head 250 is arranged above the bed plate A of the machine and is secured to a slide 251 movable in a suitable guideway formed in the main support C of the machine. The head 250 receives motion from an eccentric mechanism 252 mounted on the shaft 10, said eccentric mechanism being connected to the head by a suitable connecting rod 253, which includes a threaded portion 254 by which the length of the connecting rod may be accurately adjusted. Mounted in the head 250 are two hollow cylindrical punching members 255, the positions of these punching members in the head being accurately determined by two bolts 256, one of which is adapted to bear on the top of each of said punching members 255. Beneath the punching members 255 and surrounding each of said members, there is a stripper plate 258 which is yieldingly held by springs 259 and which is adapted to contact with the material and strip the same from the punching members 255.

Mounted in the base plate A beneath the punching mechanism above described, is a rectangular block 260 in which two tubular members 261 are clamped by means of a bolt 257, which is mounted in said rectangular block. The tubular members 261 are also supported in said rectangular block 260 by means of the threaded members 262, which engage suitable threads on the wall of the openings in which said tubular members 261 are mounted. Within each of said tubular members 261 there is a spring pressed plunger 263, each of said plungers being provided with a stem 264 which loosely engages a holding plate 265 secured beneath the bed plate A of the machine. The plungers 263 are yieldingly supported by means of coiled springs 266, which surround the stem 264 and which are arranged between said plungers 263 and the fixed members 265. From the construction just described it will be understood that after the caps are cut from the strip of blank material by means of the punching members 255 in cooperation with the tubular members 261, the plungers 263 will force said severed caps back into the opening from which they were cut, so that as the strip of blank material is fed forward, the caps will be caused to move with the same.

The head 250 carrying the punching members 255 is provided with an extension 267 which is provided with a rectangular notch adapted to cooperate with a gauge member 268 secured to the base plate A of the machine.

The head 250 also carries a bar 270, in the end of which there is mounted two rods 271 at the lower end of which compressing members 272 are mounted, each of these compressing members being yieldingly held by means of a spring 273 surrounding the said bars 271. It is to be understood that the said members constitute means so positioned as to contact with the caps held in the strips of blank material and compress the staples and tabs.

*Ejecting mechanism.*

On the end of the shaft 10 there is mounted a crank pin 275 which is adapted to impart motion to a rod 276 which carries a head 277 to which the ejecting members 278 are secured, these ejecting members being adapted to contact with the finished caps and finally eject the same from the strip of blank material. These ejecting members pass through a suitable guide plate 278ᵃ secured to the framework of the machine. The rod 276 at its lower end is provided with a head 279 upon which the head 277 is adapted to rest, these parts being held together by means of a coiled spring 280 surrounding said rod 276 and held by a collar 276ᵃ secured to said rod.

Means are provided for causing the head 277 to move longitudinally of the rod 276, such means comprising a toothed member 281 rotatably mounted in said head and positioned to engage teeth formed on said rod 276. A flexible member 282 is provided for rotating said member 281, said member 282 being secured to a short shaft 283 mounted in a socket 284 carried by the head 250 heretofore mentioned. A handle 285 is provided for rotating said shaft 283, the shaft 283 being normally locked in position by means of a spring pressed latch 286 pivoted in said socket 284. By grasping the handle 285 and rotating the shaft 283, the operator is able to rotate the member 281 mounted in the head 277 which will cause the ejector members 278 to be retracted and rendered inoperative.

*Automatic stop mechanism.*

As previously noted the main shaft 10 of the machine is driven from the power wheel 11. Adjacent the power wheel 11, the shaft 10 is somewhat enlarged (Figures 69, 72) and on this enlarged portion a collar 290 is slidably mounted, this collar being splined to the shaft, as shown at 291, which causes it to rotate therewith. The wheel 11 is provided with a hub portion 11ᵃ within which a split expansion ring 293 is mounted, a similar ring 292 being mounted on the opposite end of the enlarged portion of the shaft 10. The expansion ring 292 is surrounded by a collar member 294 fixedly mounted on the main support C of the machine. The enlarged portion of shaft 10 is grooved longitudinally, as shown at 294' (Figure 72) and at the opposite ends of this groove pins 295 and 296 are mounted in the shaft 10, these pins being provided with reduced outer ends. Mounted in the groove 294' are two pairs of levers 297, 297 and 298, 298, which levers pivot about said pins and have cooperating projections 299, 299 and 300, 300 which projections engage recesses on the inner surfaces of the expansion rings 293 and 292 respectively. The levers 297 and 298 are so arranged that when those constituting one pair are caused to move about their respective pivot pins 295 or 296, their ends are brought into contact which tends to force the projections on that particular pair of levers against the expansion ring in which they engage, with the result that such ring is caused to expand. The slidable collar 290 carries a pin which is adapted to move between the pairs of levers and move the same about the pins 295 or 296. A pivoted arm 302 engages a groove in the collar 290. It follows, therefore, that as the arm 302 is moved in one direction, the pin 301 of the collar 290 moves between levers 297 which causes the ring 293 to frictionally engage the hub 11ᵃ with the result that rotation is imparted to the shaft 10. When the arm 302 is moved in the opposite direction ring 292 is expanded and ring 293 contracts, which results in disconnecting shaft 10 from the power wheel 11 and at the same time causes frictional engagement between ring 292 and the fixed member 294 which tends to stop rotation of the shaft 10.

Normally or when the machine is in condition for operation, the arm 302 is held toward the left (Figure 69) by a hook plate 303. When in this position, the coiled spring 304 surrounding the rod 305 attached to the arm 302, is under tension. The hook plate 303 carries a pivoted weighted lever 306 which normally occupies the position shown in Figure 69. A rod 307 is attached at one end to this lever and at the other end to a solenoid 308. The lever 306 at its end is provided with a hook 306ᵃ which is adapted to engage a reciprocating part 309 which receives motion from the head 250 heretofore described. When the solenoid is excited by an electrical current, the rod 307 is drawn toward the left (Figure 69) which causes the lever 306 to engage the reciprocating part 309, and as a result lever 303 is disengaged from the arm 302. The spring 304 thereupon forces this arm to the right (Figure 69) which disconnects power wheel 11 from the shaft 10 and causes the ring 292 to contact with collar 294 which acts as a brake to stop the machine.

The solenoid is energized when certain conditions arise. When the end of the strip of blank material passes the arms 31, mounted in front of the main feed rolls 12 and 13, these arms contact with the main bed plate of the machine. At such time current can pass from the battery 310 through the solenoid 308, wires 311 and 33 arms 31 and to ground on the framework of the machine, the other side of the battery being also grounded on such framework. This is one condition which gives rise to automatic stopping of the machine. It will also be noted that between the main feed rolls 12 and 13 and the printing mechanism heretofore described, a small pivoted arm 312 (Figure 7) is arranged to lie above the strip of blank material on the bed plate A. In case such material buckles or rises from the bed plate at this point, said arm is caused to rise and in doing so it is forced by cam surface 313 into contact with the insulated contact member 314 connected to wire 311, which causes a circuit to pass through the solenoid, and results in stopping of the machine as heretofore described.

Operation.

Much of the operation of the mechanism has already been described, and a general statement will therefore suffice. The machine employs duplicate sets of mechanisms and is adapted to operate upon strips of blank material of sufficient width to make two rows of caps simultaneously, as illustrated diagrammatically in Figure 73, X and Y representing the two rows of caps in different stages of manufacture. The strips are fed intermittently by the feed rolls 12 and 13. They are first subjected to the action of the printing mechanism which is arranged to print at the proper intervals and one of the rows of caps at least may be printed in two colors if desired. The strips are next cut preparatory to forming the tabs. Following this operation the staples are applied between the ends of the cuts the staples being formed from continuous strands of wire. In the next operation the portion of the strips of material within the cuts is split and lifted to form the tabs, after which the completed caps are punched from the strips. If desired the caps after being punched from the strip may be forced back into the openings from which they were punched. They are then carried beneath the compressing members which serve to compress the staples and tabs, after which they are ejected in the finished form shown at Z (Figure 74) from the strips into a suitable receptacle such as P, which may be part of a paraffining machine. The waste material of the strips can be withdrawn from the machine by the rolls 48, 50 which are thrown into engagement by movement of the lever 15 which simultaneously throws the feed rolls 12 and 13 out of operative relation.

It is apparent that various modifications substitutions and rearrangements of the details of the mechanism herein described may be resorted to without departing from the spirit of the invention which is intended to embrace whatever constructions may fairly come within the scope of the appended claims.

What is claimed and desired to be secured by Letters Patent is:—

1. In a machine for making bottle caps or the like, the combination of means for holding a blank of material, and means for splitting a portion of such blank parallel to the surfaces thereof to form a tab.

2. In a machine for making bottle caps or the like, the combination of means for holding a blank of material, means for splitting a portion of the material of the blank parallel to the surfaces thereof to form a tab, and means for operating said holding means and said splitting means in timed relation.

3. In a machine for making bottle caps or the like, the combination of means for holding a blank of material and means for forming a tab on said blank by striking up the material adjacent one surface only of such blank.

4. In a machine for making bottle caps or the like, the combination for holding a blank of material, means for splitting a portion of the blank parallel to the surfaces thereof to form a tab and means for actuating said splitting means while the blank is held by said holding means.

5. In a machine for making bottle caps or the like the combination of means for holding a blank of material, means for splitting a portion of the material of the blank horizontally to form a tab thereon, said last named means including a splitting tool and mechanism for causing the same to contact with the blank of material and move relative thereto while the blank is held.

6. In a machine for making closing caps the combination of means for intermittently feeding a strip of the material, means for forming tabs on said strip by splitting portions thereof horizontally, and means for punching from said strip the finished caps containing the tabs.

7. In a machine for making bottle caps or the like, the combination of means for holding a blank of material, said means comprising a base plate and a plunger movable toward and from the same, the plunger adjacent the base plate being bifurcated, and a splitting tool positioned to operate in the bifurcated portion of the plunger and split a portion of the material held thereby, to form a tab on the blank.

8. In a machine for making bottle caps or the like, a base plate, a head movable toward and from said base plate, a plunger yieldingly supported in said head and adapted to clamp a blank of material against the base plate, a splitting tool carried by said head, and means for causing said splitting tool to contact with the blank of material and split the same when clamped by said plunger.

9. A machine for making bottle caps or the like comprising means for holding a blank of material, means for causing a portion of said material to occupy an elevated position with reference to the rest of the blank when held by said holding means, and means for splitting such elevated portion to form a tap on the blank.

10. A machine for making bottle caps or the like, comprising means for clamping a blank of material, a splitting tool, spring operated means for causing said splitting tool to split a portion of the material to form a tab, means for locking said last mentioned means against movement, and means for releasing said spring operated means after said clamping means has clamped the blank of material.

11. A machine for making bottle caps or the like comprising a movable head and means for operating the same, means carried by said head for yieldingly clamping a blank of material, a splitting tool also carried by said head, spring operated means carried by said head for causing said splitting tool to split the material of said blank horizontally to form a tab, means for locking said last named means against operation, and means for releasing said locking means when said head reaches a certain position.

12. A machine for making bottle caps or the like comprising a movable head and means for operating the same, means carried by said head for clamping a blank of material, means for causing a portion of the material of said blank to occupy an elevated position when held by said clamping means, and means carried by said head for splitting the elevated portion of the material of the blank horizontally to produce a tab.

13. A machine for making bottle caps or the like comprising means for holding a blank of material, means for splitting a portion of the material of the blank horizontally to form a tab, and means for mutilating the free end of the tab for the purpose described.

14. A machine for making bottle caps or the like comprising means for holding a blank of material, means for splitting a portion of the material of the blank horizontally to form a tab, and means for making a depression in the material of the blank adjacent the end of the tab.

15. A machine for making bottle caps or the like comprising means for holding a blank of material, means for splitting a portion of the material of the blank horizontally to form a tab, and means for making a depression in the material of the blank adjacent the end of the tab and for mutilating the free end of the tab for the purpose described.

16. A machine for making bottle caps or the like from a suitable blank of material comprising means for producing a cut extending between separated points on said blank and also extending part way through the material of the blank, and means for engaging the edge of said cut to split the material adjacent thereto horizontally to form a tab.

17. A machine for making bottle caps or the like from a suitable blank of material comprising means for producing a cut in the blank extending part way through the material thereof, and means for horizontally splitting the material within the area defined by said cut to form a tab on the blank.

18. A machine for making bottle caps or the like from a suitable blank of material comprising means for producing a cut in said blank extending part way through the material thereof and between separated points on said blank, means for splitting horizontally the portion of the blank defined by said cut, and means for causing said cutting means and splitting means to operate in timed relation.

19. A machine for making bottle caps or the like from a suitable blank of material comprising means for producing a cut in said blank defining a limited area thereof and extending part way through the material, and means for horizontally splitting the material within the area defined by said cut to form a tab, and means for holding the blank during such splitting operation.

20. A machine for making bottle caps or the like from a suitable blank of material comprising a cutter shaped to produce a cut between two separated points on the blank, means for limiting the depth to which said cutter may penetrate so that the cut shall extend only part way through the material, means for splitting horizontally the portion of the blank defined by said cut, and means for causing said cutter and splitting means to operate in timed relation.

21. A machine for making closure caps from a suitable blank of material comprising, a cutter shaped to produce a cut between two separated points on the blank, means for limiting the depth of said cut so that the same shall extend only part way through the material, a splitting tool, means for moving said tool into contact with said blank adjacent said cut to split the same and common means for operating said cutter and splitting tool.

22. A machine for making bottle caps or the like comprising means for feeding a strip of material, means for producing cuts in said strip partially surrounding limited portions thereof and extending partially through the material, means for splitting such limited portions of the strip horizontally to form tabs on the strip, and means for punching from the strip the finished caps containing the tabs.

23. A machine for making bottle caps or the like from a suitable blank of material, comprising means for producing a cut in the material of the blank partially surrounding a limited portion thereof and extending part way through the material, means for clamping and holding the blank of material in fixed position, means for causing said limited portion of the blank to be elevated with reference to the surrounding material thereof, and means for splitting said elevated portion horizontally to form a tab on the blank.

24. A machine for making bottle caps or the like from a blank of material comprising means for producing a cut in the material of the blank extending between separated points thereof and also extending part way through the material, means for applying a staple to said blank between said separated points, and means for horizontally splitting the portion of the blank defined by said cut to form a tab on the blank.

25. A machine for making bottle caps or the like comprising means for feeding a strip of material, means for producing a series of cuts in said strip extending between separated points thereof and also extending part way through the material thereof, means for applying staples to said strip between said separated points, means for horizontally splitting the portion of said strip defined by said cut and means for punching from the strip the finished caps containing the tabs.

26. A machine making closing caps from a blank of material comprising means for producing a U-shaped cut in the material of the blank and extending part way through such material, means for applying a staple to said blank between the arms of said U-shaped cut, and means for splitting horizontally the material within said U-shaped cut to form a tab.

27. A machine for making bottle caps or the like from a suitable blank of material comprising means for applying a staple to said blank and means for splitting the material of the blank horizontally adjacent the staple to form a tab.

28. A machine for making bottle caps or the like comprising means for feeding a strip of suitable material, means for forming staples, means for applying the formed staples to the strip, means for splitting the material of the strip horizontally adjacent the staples to form a tab, and means for punching from the strip the finished caps containing the staples and tabs.

29. A machine for making bottle caps or the like from a suitable blank of material comprising means for producing a cut extending between two separated points on such blank and part way through the material, means for applying a staple to such blank at the base of the area defined by such cut, and means for splitting the material within such area horizontally to form a tab.

30. A machine for making bottle caps or the like comprising means for intermittently feeding a strip of blank material, means operating intermittently to make a cut in said blank defining a limited portion thereof, staple forming mechanism, means for intermittently feeding a wire to said staple forming mechanism, means for applying said staples to said blank in desired relation to said cut, and means for splitting horizontally the portion of said blank defined by said cut, and a common shaft for operating all of said mechanisms.

31. A machine for making bottle caps or the like from suitable blank material comprising means for feeding a continuous length of wire, means for cutting said wire into lengths and forming the same into staples, means for forcing said staples through the blank material, means for clinching the ends of said staples and means for splitting the material of the blank horizontally adjacent the staples to form tabs.

32. In a machine for making bottle caps or the like, the combination of means for feeding a strip of material, means for simultaneously forming tabs on said strip at a plurality of points by splitting portions thereof horizontally, and means for punching from said strip the finished caps.

33. In a machine of the kind described, means for feeding a strip of material, means for simultaneously making cuts in said strip at a plurality of points and extending part way through the material thereof, means for simultaneously splitting the material horizontally adjacent said cuts to form a plurality of tabs, and means for punching from said strip the finished caps.

34. In a machine for making bottle caps or the like, means for holding a blank of material, means for making a cut between separated points on the blank and extending part way through the blank, and means for applying a staple to the blank adjacent the ends of the cut.

35. A machine for making bottle caps or the like from a blank of material comprising means for striking up the material of a blank adjacent one surface only thereof, and means for subsequently pressing the tabs back into the material.

36. A machine for making bottle caps or the like from a blank of material comprising means for striking up the material of the blank adjacent one surface only thereof to form a tab, means for applying a staple to the blank adjacent the base of the tab and means for subsequently pressing the tab back into the material and for completely clenching the staples.

37. In a machine for making bottle caps or the like, means for feeding a sheet of material, means for simultaneously applying staples to said strip at a plurality of points, means for simultaneously splitting the material of said strip horizontally adjacent said staples to form tabs and means for punching the finished caps from the strip.

38. In a machine for making bottle caps or the like, means for intermittently feeding a strip of material, means for making cuts in said material extending part way through the same, means for applying staples to said strip adjacent said cuts, means for splitting and lifting the portions of the strip defined by said cuts to form tabs, means for punching from the strip the caps containing the tabs and staples, means for forcing the caps back into the openings in the strip, means for applying pressure to said caps to completely clench the staples and force the tabs into contact with the caps, and means for finally ejecting the caps from the strip.

39. A machine for making bottle caps or the like, comprising a feed roll adapted to feed a strip of material through the machine, means for operating the roll, means for yieldingly holding said roll in operative position, means for moving said roll out of operative position, means for forming tabs on said strip, means for punching finished tabs from said strip, means for drawing the waste material of said strip from the machine, and means for causing said last named means to operate when said feed roll is moved out of operative position.

40. In a machine of the kind described, a feed roll adapted to feed a strip of material, means for yieldingly holding said roll in operative position, means for moving the same out of operative position, means for forming and punching articles from said strip, waste ejecting mechanism comprising a movable roll, means for driving the same and means for moving said last named roll into operative position to draw the waste material from the machine when said first named roll is moved to inoperative position.

41. A machine for making bottle caps or the like comprising mechanism for feeding a strip of blank material, mechanism for forming tabs on said strip from part of the material thereof, mechanism for punching from the strip the finished caps, an operating shaft common to all of said mechanisms, a clutch mechanism through which power is applied to said shaft, and means for automatically releasing said clutch to stop the shaft under predetermined conditions.

42. In a machine for making bottle caps or the like, a bed plate, means for feeding a strip of material thereover, a head movable toward and from the bed plate, means carried by said head for clamping the material when said head is moved toward the bed plate, a plurality of splitting tools, a slide plate carried by said head to which said tools are connected, and means for operating said slide when the material is held by said clamping means.

43. In a machine for making bottle caps or the like, a bed plate, means for feeding a strip of material thereover, a head movable toward and from the bed plate, a plurality of splitting tools carried by said head, a slide plate to which each of said tools is pivotally connected, and spring actuated means for moving said slide and tools when said head is moved toward the bed plate.

44. In a machine for making bottle caps or the like, means for feeding a strip of material, means for simultaneously making a plurality of cuts in said strip at a plurality of separate points and extending part way through the material of the strip, means for simultaneously applying staples to the strip adjacent the cuts, means for simultaneously splitting the material of said strips horizontally within said cuts to form tabs and means for punching the finished caps from the strip.

45. In a machine for making bottle caps or the like, means for feeding a strip of material, means for simultaneously making a plurality of cuts in said strip at a plurality of separate points and extending part way through the material of the strip, means for simultaneously applying staples to the strip adjacent the cuts, means for simultaneously splitting the material of said strip horizontally within said cuts to form tabs, means for punching the finished caps from the strip, and a common shaft for operating all of said means.

In testimony whereof I affix my signature.
OREN F. BALTZLEY.